(12) United States Patent
Kelley et al.

(10) Patent No.: US 7,711,784 B2
(45) Date of Patent: *May 4, 2010

(54) AUTONOMIC E-MAIL PROCESSING SYSTEM AND METHOD

(75) Inventors: Edward E. Kelley, Wappingers Falls, NY (US); Tijs Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 11/848,585

(22) Filed: Aug. 31, 2007

(65) Prior Publication Data

US 2007/0294358 A1    Dec. 20, 2007

Related U.S. Application Data

(63) Continuation of application No. 10/604,583, filed on Jul. 31, 2003, now Pat. No. 7,359,947.

(51) Int. Cl.
*G06F 15/16* (2006.01)

(52) U.S. Cl. .................. 709/206; 715/751; 715/752

(58) Field of Classification Search ................ 709/203, 709/204, 206, 207; 340/531; 713/201
See application file for complete search history.

(56) References Cited

U.S. PATENT DOCUMENTS

| | | | |
|---|---|---|---|
| 5,632,018 | A | 5/1997 | Otorii |
| 6,226,670 | B1 | 5/2001 | Ueno et al. |
| 6,279,042 | B1 | 8/2001 | Ouchi |
| 6,370,567 | B1 | 4/2002 | Ouchi |
| 6,421,709 | B1 | 7/2002 | McCormick et al. |
| 6,442,592 | B1 | 8/2002 | Alumbaugh et al. |
| 6,691,153 | B1 | 2/2004 | Hanson et al. |
| 6,930,598 | B2 | 8/2005 | Weiss |
| 7,139,801 | B2 | 11/2006 | Smith et al. |

(Continued)

FOREIGN PATENT DOCUMENTS

WO    0213469 A2    2/2002

(Continued)

*Primary Examiner*—Dustin Nguyen
(74) *Attorney, Agent, or Firm*—Cantor Colburn LLP; Ronald Kaschak

(57) ABSTRACT

Internally within an organization, e-mails are often sent to multiple recipients to request information or ask that a task be performed by one or more, but less than all, of those recipients. The Systems and method help minimize overall time burden to those recipients in responding to or trying to track such e-mails, and help the sender and recipients alike more easily view, manage and control such e-mails and their ultimate disposition, including the sender's e-mail and the plurality of responses sent by recipients. Separate viewable areas for each string or chain of related autonomic e-mails within each user's e-mail in-box and other e-mail storage areas are provided. The e-mail's sender and at least certain recipients can help decide whether to terminate a particular thread of autonomic e-mail communications by designating it as completed or canceled. Those emails which have not yet been read by recipients can be moved to a "completed" folder or deleted altogether. This in turn saves the review time of those recipients who have been away or too busy to check the e-mails within their respective in-boxes.

20 Claims, 13 Drawing Sheets

U.S. PATENT DOCUMENTS

| | | |
|---|---|---|
| 2002/0087646 A1 | 7/2002 | Hickey et al. |
| 2002/0120581 A1 | 8/2002 | Schiavone et al. |
| 2003/0110211 A1 | 6/2003 | Danon |
| 2004/0128540 A1 | 7/2004 | Roskind |
| 2004/0158610 A1 | 8/2004 | Davis et al. |
| 2004/0210450 A1 | 10/2004 | Atencio et al. |

FOREIGN PATENT DOCUMENTS

| | | |
|---|---|---|
| WO | 0213470 A2 | 2/2002 |

AUTONOMIC E-MAIL PROCESSING SYSTEM AND METHOD

CROSS REFERENCE TO RELATED APPLICATION

This application is a continuation application of U.S. Ser. No. 10/604583, filed Jul. 31, 2003, now U.S. Pat. No. 7,359,947, the contents of which are incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

The present invention relates generally to systems and methods for the processing of e-mail, and specifically to systems and methods for the autonomic handling of e-mails addressed to multiple recipients which require some type of a response, such as the provision of information or the accomplishment of a task, with a view toward minimizing the overall burden to the group of recipients in responding to or trying to track such emails.

E-mail has become an increasingly important means of communicating with others as well as an important business tool that is used for many different purposes. But the volume of e-mail is constantly increasing with a concomitant increase in the amount of time that the e-mail recipients must spend in reading and responding to the e-mail. Within larger organizations, the total amount of time spent by the workers reading e-mails, including e-mails that do not even require a response, is considerable. On occasion, time is also spent trying to track a series of related emails, particularly when they are not all linked in chain fashion. For example, some may have come from different individuals who may be responded to a request with a new e-mail, rather than a simple reply, so there is not necessarily an automatic link back to the original e-mail.

A particularly useful feature of e-mail is the ability to send the same e-mail to multiple e-mail addresses, such as a distribution list or other group, at the same time. Frequently, the purpose of sending an e-mail message to group is to request that one of the recipients of the e-mail provide information to the sender of the e-mail or perform a task that the sender of the e-mail requested. Such an e-mail can be said to contain a "to-do" item. In a typical to-do e-mail sent to a group, one or more of, but not all of, the recipients of the e-mail are typically expected to provide information or to accomplish a task that was requested in the e-mail. E-mail requests frequently are deliberately sent to multiple recipients in this manner because the sender needs a quick response, or is unsure of who in the group has the specific knowledge required to answer the inquiry, or who has time to perform the task.

One benefit of sending an e-mail with a to-do item to multiple recipients is that the sender generally receives a faster response than if the sender had only sent the e-mail to one recipient. This is because the first recipient that is available to handle the to-do item will generally respond to it. If such an e-mail request were to be sent to only one person, that person may not be able to respond, perhaps because of being too busy or being out of the office or away from his or her computer. In such cases, the originator of the e-mail would receive a slower response to the originator's request than if the to-do e-mail had been sent to a recipient who was able to respond without a significant delay. Often, the sender may receive the desired response before other recipients in the group have even opened and/or read the e-mail. Or the sender may promptly receive some further information that renders unnecessary the pursuit of the requested information.

In such cases, we have recognized that it would be useful to have a streamlined method or technique of notifying the other recipients in the group that the requested information has been provided, that the requested task has been performed or that the requested information or task is no longer needed. One goal of the present invention is to eliminate the time that the other recipients would have to spend in reading such an e-mail, or in trying to provide the requested information or perform the requested task when it had already been completed by another.

Existing e-mail systems, to our knowledge, do not provide any type of mechanism for automatically indicating to a group of other recipients of the "to-do" e-mail that a recipient of the e-mail had responded to it or that another recipient had provided the requested information or performed the requested task. Currently, a recipient who resolves the to-do e-mail can notify the other recipients of the to-do e-mail by forwarding yet another e-mail to everyone on the distribution list to inform them that the to-do item in the e-mail had been performed. Alternatively, the sender can send out another email saying in effect that "I have received the requested information" or "the requested task has been handled" or "the requested no longer needs to be done."

In a conventional e-mail system, either of the foregoing procedures would create yet another message in the in-box for each user on the distribution list. This in turn takes up more time since the recipients have to read it too. Moreover, if in the meantime other e-mails had come into the mailboxes of that recipient or other recipients, there is a good chance that the original to-do e-mail and the follow-up message from the first recipient to respond saying, "I have handled the to-do item," or from the sender saying "I received my answer" or "the task has been completed" would be separated by one or more intervening e-mails in the in-boxes of the various recipients. This in turn only adds to the burden of the sender or the recipients in trying to match up disparate e-mails that are coming in to determine if the task has been completed.

Lastly, a number of modern e-mail systems have so-called "advanced sorting" features or "rules wizards" for automatically directing incoming e-mails to certain pre-defined folders and even can optionally mark the incoming e-mails as having been read or can flag up them for follow-up. Yet, they do not, to our knowledge, permit the sender or other recipients of the same message to have, at a later time, these already-sent e-mails in a recipient's main in-box or in certain designated folders automatically marked for a different disposition, such as directing them to a different folder.

SUMMARY OF THE INVENTION

In light of the foregoing limitations associated with the known e-mail systems, and as part of the present invention, we have recognized it would be useful to have an automatic way of handling the above-noted e-mail situations so as to minimize the total amount of time spent by individual recipients and indeed by the overall group in responding to and otherwise processing such e-mails. We have also recognized that those e-mails directed to a group of recipients, such as the "to-do" e-mails, are particularly in need of a more effective way to handle them and to group them depending on their response status. In this regard, we have recognized that it would be useful to have an automatic system and method for coordinating related e-mail items so that after the first recipient who fulfilled the request made in the e-mail has responded, none of the other members in the recipient group would need to take any specific action. Instead, it would be better if they were informed automatically that the request had been handled. As will be further described below, our system has such features.

As part of our invention, we have also recognized that it would be useful if the e-mail server system itself would include a component or a subsystem that would recognize that a message requiring a response from one or more but not all of the recipients had been sent to multiple recipients and that, due to changed conditions, a response was no longer required. Accordingly, our system includes such a feature. Also, the recipients who had not yet opened the sender's e-mail will be informed that the sender's request had already been fulfilled (or is no longer needed) and thus, the recipients need not even review the original e-mail. Our system has a set of features which provides such functionality. As is further explained below, the present invention includes a system of components, for use within an existing e-mail server system, that permits the sender and optionally a recipient or a selected class of recipients to voluntarily indicate to the e-mail server system that a previously-sent message no longer requires a response. There might be more than one reason for wanting to do this, including but not limited to: (a) one or more recipients have responded with useful information and/or completed the task; (b) the sender in the meantime answered his or her own request; and/or (c) the sender (or an authorized recipient) in the meantime determined that the task had been completed or is no longer needed.

In light of the foregoing, there is provided, in accordance with the present invention, novel systems and methods designed to provide for the autonomic processing of e-mail messages containing a request, such as asking for information or the performance of a task, which are to be sent to a group of recipients. By "autonomic processing," we mean that the system or method of the present invention itself would control the notification process appropriately without requiring input from the recipients of the e-mail messages, especially who did not respond to it, or who have not even looked at it. In one variation of the present invention, the recipients of the e-mail who responded to the e-mail are prompted to or required to indicate, through a radio button or other indicator, that a suitable response was provided, thus completing the request or task. If this occurs, then the autonomic e-mail system performs the other steps necessary to notify all other users who received the e-mail, but had not read it, that a suitable response had already been provided. Optionally, the system can notify even those who had read it but elected not to respond, that a suitable response had already been provided.

In the systems and methods of the present invention, the sender of e-mail messages and the recipients of e-mail messages may designate them for autonomic processing and may make other choices at in various situations in ways that will be described below. In general, the designations, selections and de-selections mentioned herein may be implemented in known or suitable way that gives users of a computer one or more choices with respect to activities or options. Typically, these designators or choices may be placed on the user's screen in any convenient place, including in a tool bar, a dialog box or a pop-down menu, or in a column or cell next to a portion of the autonomic e-mail message in question. Accordingly, radio buttons or other selection devices, fill-in-the-blank boxes, or any other type of user-selectable indicators including selectable dots, flags or other symbols may be used. Typically, such choice devices are preferably accompanied by suitable word legends, symbols and/or icons that can the user can readily grasp or learn the import of relative to the choice(s) that are to be made or are being offered at different phases of the autonomic e-mail process. A help box with legend or symbol explanation may also be provided in any suitable format including but not limited to a table. These implementation details are choices with which designers of e-mail systems are familiar, so they need not be further described here.

In the systems and methods of the present invention, a first identification number is added to a sender's e-mail to designate it for autonomic handling. This number may be any suitable-length string of characters, and is preferably long enough to make it unique at least relative to non-archived e-mail messages resident on a particular autonomic e-mail processing system. This ID number may be called the sending identification number or sending identification (SID) for short. The systems and methods of the present invention uses this number or code to track and process related e-mails in ways that will be further explained. All or part of the SID or yet another indicator may be provided on or associated with the sent message to signify that this e-mail message has been designated for autonomic processing. This e-mail from the sender may be called an "autonomic e-mail" for short. If the sender of an autonomic e-mail wants to see all responses, then the sender may select another designator to force all responses to be autonomically processed.

In the systems and methods of the present invention, the selection by the sender of an e-mail message for autonomic processing causes the generation of a second or responding identification (RID) number that is used in connection with the responding e-mail.

If the sender has not designated that all responses be autonomically processed, then when a recipient responds to an autonomic e-mail, he or she is preferably asked or prompted to select a second radio button or other indicator if that recipient wants his or her response to be autonomically processed. This selection will also cause the generation of a RID number that is used in connection with the responding e-mail. This RID number, whether generated due to the action of the sender or a recipient, is used to distinctly identify this response, relative to all other autonomic responses to the sender's autonomic e-mail, including a further response from the same recipient. The RID number may be used as an add-on (e.g., a suffix) to the sending identification number that the sender of the e-mail caused to be created. In the response, the recipient may provide the requested information or may indicate that he will perform the task or that the task is already completed or should be canceled because it is not needed, perhaps in light of some other information. If any one of these situations occur, the sender's request is for all practical purposes complete. If so, the responding recipient may select a third indicator on or associated with the e-mail, to effectively indicate the completion of the sender's autonomic e-mail.

If none of the responding users has selected the third indicator on the e-mail to indicate a state of completion, the system of the present invention determines that no one has yet definitively responded to the e-mail. Accordingly, the sender's e-mail is classified as an "In Process Autonomic E-Mail" or put under some similar heading that suggests the e-mail has been sent to a number of recipients and is still awaiting a definitive response from one or more of them. Recipients are allowed to participate with an autonomic response that is non-definitive. For example, they may ask for more information, advise the sender of the name of the person(s) who may have the requested information or they may state that they would like to perform the requested task, but cannot do it on account of other commitments, etc. For any non-definitive autonomic response, the second indicator should be selected, but the third indicator should not be.

The sender, upon receiving the autonomic responses, is given the opportunity by the system to himself select the third indicator or to accept a recipient's selection of the third indicator, or to deselect it. If accepted by the sender, the e-mail's request is considered answered and/or the requested task is considered to be accomplished, and the autonomic system so indicates to both the sender and all of the recipients. In this manner, the sender and recipients will have a record of the "completion" of the sender's autonomic e-mail and also will understand that the request has been completed. Preferably, this "completed" status is indicated by a short word such as "DONE" or other short or simple phrase or symbol. If desired, the system of the present invention may optionally indicate to other recipients who responded to the sender's e-mail, who completed it and/or when they completed it. Further, if the sender so specifies to the system, inquiring recipients may be given access to the other recipient's responses, so that they can see the responses for themselves.

Also, if desired, the system of the present invention may be arranged to build a secondary in-box or other secondary repository within the e-mail system for the completed e-mails including the responses thereto. It transfers the completed autonomic e-mail from each recipient's in-box or primary e-mail repository to a secondary in-box or secondary repository within the e-mail system. The heading for this secondary in-box or repository is "Completed Autonomic E-mail" or some other heading that indicates there is e-mail with a request that was sent to several recipients, one of which answered the e-mail in a manner sufficient to satisfy the request for information or the task to be performed. In addition, the system optionally may autonomically provide an attachment to each of the e-mails placed in the secondary in-boxes of all of the other recipients of the "to-do" e-mail. This attachment provides information about the response(s) that were received to the sender's e-mail. The originator of the "to do" e-mail may also re-open the "to do" e-mail on receipt of the message indicating the "to do" item has been handled.

One exemplary embodiment of the autonomic e-mail processing (AEMP) system of the present invention is for use as part of an existing e-mail server system. Such an AEMP system may be comprised of at least six components, which may be implemented as separate software programs, routines or objects, and which may be run under the control of a suitable supervisory program. These six components are as follows. A first component is provided for enabling a sender of an e-mail message to designate a first e-mail message for autonomic processing, where that first e-mail message has at least an address portion which identifies a plurality of intended recipients and a note portion which contains information to be sent to the intended recipients of the e-mail. A second component is for identifying the first e-mail message designated for autonomic processing with a unique sending identification number (SID number) within the autonomic processing system. A third component is operable to enable each intended recipient to indicate that an autonomic response is being sent in response to the first e-mail message. A fourth component is for identifying each autonomic response to the first e-mail message with a responding identification number (RID number) that in combination with the unique sending identification number for first e-mail message within the autonomic processing system is unique that is, provides unique combined identification number (CID number). A fifth component is operable to enable the sender of the first e-mail message to indicate that the processing of the first e-mail message has been completed. A sixth component is operable to inform at least a plurality of the intended recipients that the processing of the first e-mail message has been completed. Further details of this embodiment of the system of the present invention and the components thereof are provided later on below.

An exemplary method of the present invention for use in an e-mail system, may be summarized as follows. The method is for allowing regular senders of e-mail messages to select certain of their e-mail messages for autonomic processing, and thereafter processing those selected e-mail messages autonomically. The exemplary method comprises the following eight steps (a) through (h). Step (a) provides means for a plurality of senders of e-mail messages within an organization to designate selected e-mail messages of theirs and responses thereto for autonomic processing. Step (b) designates, via a selection made by a first sender, at least a first e-mail message for autonomic processing. Step (c) identifies a plurality of intended recipients in an address portion of such first e-mail message, and enters information in a note portion of such first e-mail message. Step (d) identifies the first e-mail message designated for autonomic processing with a unique sending identification number within the e-mail system. Step (e) provides means for each intended recipient of such first e-mail message to indicate that an autonomic response is being sent in response thereto. Step (f) identifies each autonomic response to such first e-mail message with a responding identification number, and preferably that number in combination with the unique sending identification number for such first e-mail message within the e-mail system is unique. Step (g) provides means to enable the sender of such first e-mail message to indicate that the processing of the first e-mail message has been completed. Finally, step (h) informs at least a plurality of the intended recipients that the processing of such first e-mail message has been completed.

As previously alluded to, step (h) may be performed by automatically moving such first e-mail message, upon being designated as completed, to a folder within the recipient's set of e-mail folders that is for holding completed autonomic e-mail messages. Step (h) may be performed by automatically attaching to such first e-mail message within the in-box of the recipients thereof, an indicator signifying that the processing of such first e-mail message is considered to be completed. Step (h) may also be performed by automatically deleting such first e-mail message from the in-boxes of at least those recipients thereof that have not yet provided an autonomic response to the first such e-mail message. These and other aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIGS. 5 and 6 illustrate how the process software implementing the systems and methods of the present invention may be integrated into client, server and network environments;

FIGS. 7 and 8 illustrate several ways in which the process software of the present invention may be semi-automatically or automatically deployed across various networks and onto server, client (user), and proxy computers;

FIGS. 9, 10 and 11 illustrate how process software for implementing the systems and methods of the present invention deployed through the installation and use of two different forms of a virtual private network (VPN); and FIGS. 12 and 13 illustrate how the process software for implementing the systems and methods of the present invention Process can be deployed through an On Demand business model, which allows the process software to be shared and simultaneously service multiple customers in a flexible, automated fashion under a pay-for-what-you-use plan.

DETAILED DESCRIPTION

The present invention is illustrated and described herein in connection with certain embodiments, with the understanding that the present disclosure is to be considered as an exemplification of the principles of the invention and the associated functional specifications required for its implementation. However, it should be appreciated that the systems and methods of the present invention may be implemented in still different configurations, forms and variations, based on the teachings herein.

The systems and methods of the present invention typically operate in and as part of a computer network which has an e-mail server for receiving and sending electronic messages which are frequently just called e-mail. This server may be and often is part of an enterprise computing environment. The network may receive e-mail messages that originate from the Internet or an intranet. The term "intranet" as used herein refers to the infrastructure of the Internet or resembling the Internet that is used privately for the purposes of a specific enterprise, and includes a virtual private network (VPN). The e-mail server may be connected to the Internet if desired through one or more firewall servers and/or proxy servers, as is known in the art.

Figure 1:
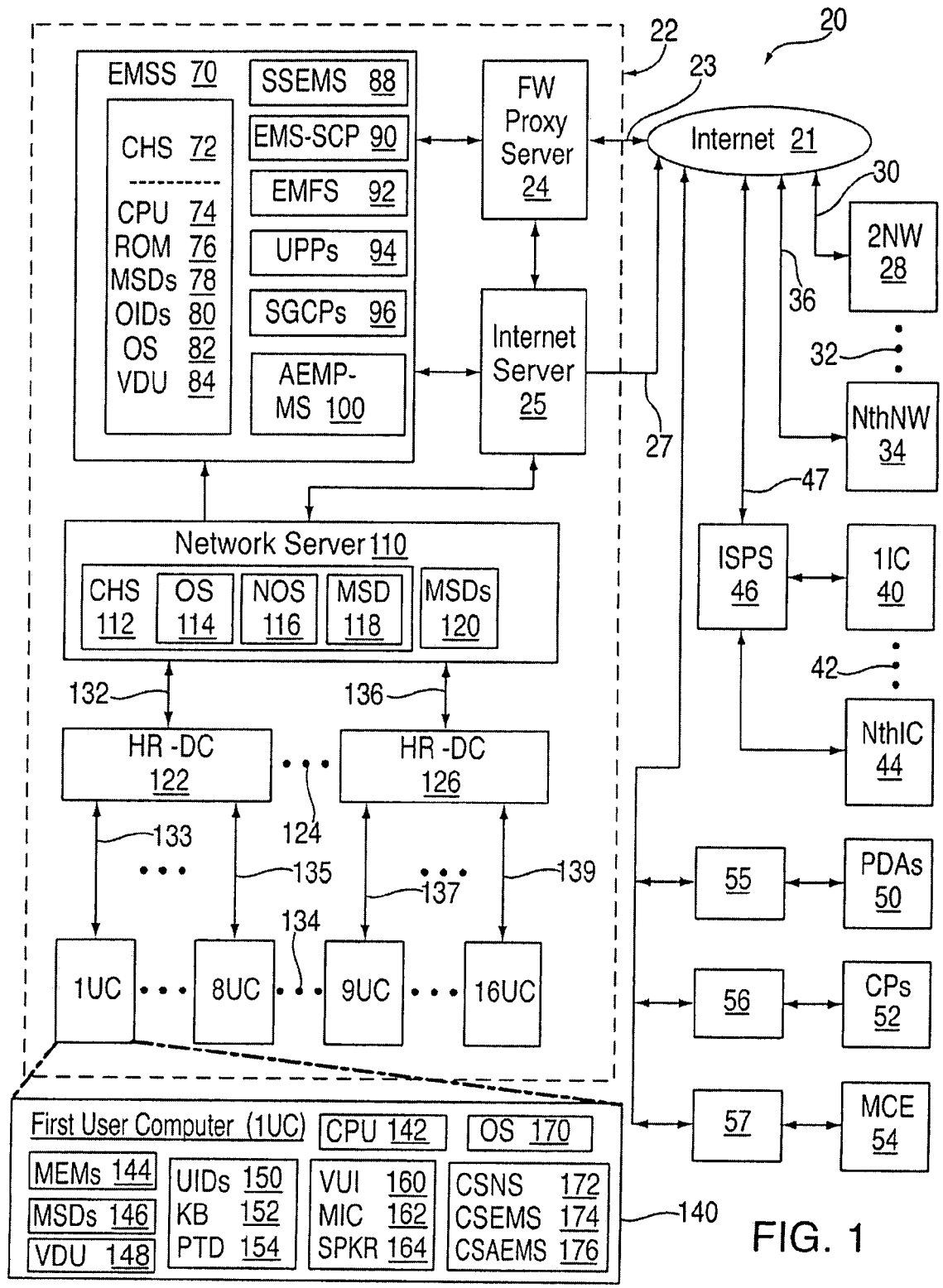
FIG. 1 is a simplified block diagram showing a typical e-mail server system and series of networks in which the autonomic e-mail system and methods of the present invention may be used.

FIG. 1 is a simplified system block diagram showing an archetypical computer network environment 20 in which the autonomic e-mail processing (AEMP) system and methods of the present invention may be utilized. In environment 20, a key portion of the autonomic e-mail processing (AEMP) system of the present invention, which may be called the AEMP management system 100, is shown within an exemplary e-mail server system 70, which in turn is part of a first computer network 22. (Network 22 is shown encircled in the dashed box for ease of identification.) By way of background, and to better understand how the systems and methods of the present invention may be utilized in the context of conventional e-mail communications., it useful to briefly review the various elements shown in FIG. 1.

In FIG. 1, the Internet, represented by oval 21, is shown connected via communications paths 23 to the first network 22 through the network's firewall/proxy server 24. If desired, a separate Internet server 25 for network 22 may also be connected to the Internet through server 24 as shown or through a separate firewall/proxy server (which may be part of server 25) via an alternate communications path 27. E-mail messages from network 22 may be routed through either server 24 or server 25 to reach the Internet, but communications through a firewall and proxy server are generally preferred for security reasons.

A second network 28 is shown connected the Internet by communications path 30, and an Nth network 34 is shown connected to the Internet by path 36. Ellipses 32 represent the many other networks that are part of the overall Internet and connected thereto, but not shown in FIG. 1. Autonomic e-mail messages based on the systems and methods of the present invention can be used on and sent over many these networks, and can be sent and received by the computers and smart devices shown in FIG. 1, as well.

As is well-known, many individual computers, represented by individual computers 40 and 44 and ellipses 42 therebetween, are connected to the Internet through an Internet service providers (ISPs), represented by ISP station 36, via suitable dial-up modems, cable modems and/or wireless modems (not shown to reduce drawing clutter). ISP stations typically have their own computer systems, which may be used to store e-mail messages, now including the autonomic e-mail messages of present invention, temporarily or permanently on their own hard drives or other mass storage devices for later retrieval. Or they may simply forward received e-mail messages, now including autonomic e-mails, in both directions onto the next computer. ISP stations in turn link to the Internet 21 by any known or suitable type of communications link illustrated by path 47.

FIG. 1 shows that smart other devices containing microcomputers therein such as personal digital assistants (PDAs) 50, cell phones (CPs) 52, or any other kind of suitably equipped microprocessor-controlled electronic (MCE) devices 54 (such as express delivery order input scanners and smart vending machines, to name a few) may and are being linked to the Internet as well. Their communication links 55, 56 and 57, like others shown or referred to in FIG. 1, may take any conventional or needed form, including but not limited to satellite links, RF wireless links, optical links or conventional conductors (e.g., twisted pair wires or coaxial cable). These different types of links each have their own well-known communications protocols and hardware and software devices (not shown) in order to make the necessary connections to the Internet, that need not be further described here, except as follows.

Networks 22 and 28 through 34, the individual computers 40-44, and the smart devices 50-54 are now almost capable of (and/or will soon virtually be capable of) sending and receiving e-mail messages in one or more formats, including the autonomic e-mail messages of the present invention. In particular, many of these individual computerized devices, from laptop computers, to PDAs, CPs and MCEs have been, are being or will soon be provided with all the attributes of a desktop computer system required to be able to allow a user receive, send and process, via various selections to be made from time to time, autonomic e-mails. Such computerized devices include a CPU, local writable memory for receiving or composing e-mails, a visual display screen for viewing such e-mails and the indicators which signify an autonomic e-mail and the choices and identification number(s) associated therewith. Also, such devices typically have one or more input devices often including a keyboard and/or a pointing device such as a mini-joystick or a pointing stylus. A stylus for example can used in combination with a touch-sensitive visual display screen, to enter data, point to parts of the screen, or otherwise make selections when presented with choices to make on the screen. Even voice-activated communications can used to navigate information displays and menu choices presented on computer screens.

In FIG. 1, the e-mail server system (EMSS) 70 of network 22 is shown in greater detail to help better explain at least one way that the autonomic e-mail processing (AEMP) system and methods of the present invention may be utilized and implemented. Server system 70 includes a computer hardware system (CHS) 72 upon which the core elements of a conventional e-mail system are loaded and run. These include but are not necessarily limited an e-mail server supervisory control program (EMS-SCP) 90, and user profile and permission programs (UPPs) 94, which may also include security/gateway control programs (SGCPs) 96. CHS 72 typically has one or more processors (CPUs) 74, read-only and writable memories (MEMs) 76, mass storage devices (MSDs) 78, operator interface devices (OIDs) 80, and a suitable operating system (OS) 82. The OIDs typically include one or more visual display units (VDUs), and other user interface devices (UIDs) such as keyboards and pointing devices (such a mouse or light pen or stylus) that can be pointed at or brought to bear against a light- or touch-sensitive screen or pad in order to enter data and to make user selections or choices. Importantly, a typical e-mail server system has server-side e-mail software components (SSEMS) 88 which interact as needed with client-side e-mail software components (CSEMS) located typically in various places including oil individual client (user) desktop computers, laptops or other user-operated smart computerized devices, such as PDAs and e-mail enabled cellphones.

E-mail server system 70 also includes a largely conventional e-mail server supervisory control program (EMS-SCP) 90 and suitable e-mail file system (EMFS) 92 for storing e-mail messages which are typically located on one or more of the MSDs 78. File system 92 may include or be implemented as database, a series of files or any other data storage structure conventionally used or suitable for storing e-mail messages (including and their attachments) and related files. They can also be arranged with very little further effort to store the additional data and control information associated with autonomic e-mail messages, as explained herein. MSDs 78 may be any kind of magnetic disk drives, optical disk drives, flash memories, or other electronic memories, or the like, now or later known or used for storing e-mail messages and related files, as well as other data.

Block 100 in FIG. 1 represents the core of autonomic e-mail processing management system (AEMP-MS) 100 of the present invention. Which is the core of the AEMP system. This AEMP management system is more detail shown in FIG. 2 and will described in connection with FIGS. 2 through 4. In practice, in regular e-mail server systems, the bulk of the e-mail system resides on the e-mail computer system 70, but smaller parts thereof, such as client programs, which also may be considered to form part of the e-mail system, reside on individual user computers or other network computers, particularly when the user computers are remotely located, rather than being part of a local area network (LAN) such as network 22.

Within the dashed box of network 22 of FIG. 1 are shown further items typically found on or in a computer network of a larger organization. Typical items include a network server 110 which typically resides on its own computer hardware system (CHS) 112. System 112 has its own operating system (OS) 114 and a network operating system (NOS) 116 and its own mass storage devices (MSDs) 118 for storing all of this software and network information operating parameters and other data. Server 110 may also have still other mass storage devices 120 for holding the folders and files of various users of the network.

Network 22 may also include HR-DC blocks 122 and 126 representing conventional hubs (H), routers (R) and/or data concentrators (DC) which are connected on one side to the network server 70 via communication paths 132 and 136. The other side of the HR-DCs are shown connected to various user computers (UCs). User computers (e.g., first user computer 1UC through eighth user computer 8UC) are shown connected to the first HR-DC block 122 via suitable communication links 133-135, which may be coax cables, twisted pair wires, or the like. Similarly, connected to HR-DC block 124 are several user computers (e.g., ninth user computer UC 9, tenth user computer UC 10, and sixteenth user computer UC 16). As indicated by ellipses 124, additional HR-DCs and communication paths (not shown) from network server 70 may extend to still further user computers (not shown) as indicated by ellipses 134, which may be part of network 22. More or fewer computers may be attached to this or any given network through suitable communication links or paths, which may include but are not limited to physical wires, cables, RF wireless links and/or optical links.

As illustrated by enlarged block 140 representing the first user computer 1UC, any one of these user computers may and typically will have a processor (CPU) 142, main memories 144, one or more mass storage devices (MSDs) 146, visual display units (VDUs) 148 and other user interface devices (UIDs) 150, such as a keyboard (KB) 152, a pointing device (PTD) 154 such as a mouse, electronic or light stylus and/or a touch screen or an electronic digital tablet. Optionally, a user computer may also have a voice-activated user interface (VUI) 160 with a microphone input device (MIC) 162 and optionally one or more audio speakers (SPKR) 164 to enable the user to point to and select various buttons, toolbars, pulldown menus and still other spots on a visual display screen through the use of voice commands. In certain applications a listing of choices or options by artificial voice via a speaker through speech generation software, along with a microphone or other suitable input device, such as the not limited to a joystick, touchpad or set of buttons, allows a computer user to make choices by voice or in response to a verbal command or verbal list almost as easily as by using a conventional visual display screen and finger-operated keyboard, buttons or pointing device.

Archetypical user computer 140 also includes conventional software, such as its own operating system (OS) 170, client-side network software (CSNS) 172, and client-side e-mail software (CSEMS) 174. Also, in order to facilitate implementation of the autonomic e-mail processing, client-side autonomic e-mail software (CSAEMS) 176 may be provided. For example, when a user makes certain selections of buttons or other indicators provided by the autonomic e-mail system of the present invention, the CSAEMS may be used to initiate the automatic process which takes place in connection with that selection. It should be appreciated that such appropriate client-side autonomic e-mail software may be written for any of the computerized user devices illustrated in or mentioned in connection with FIG. 1.

Figure 2:
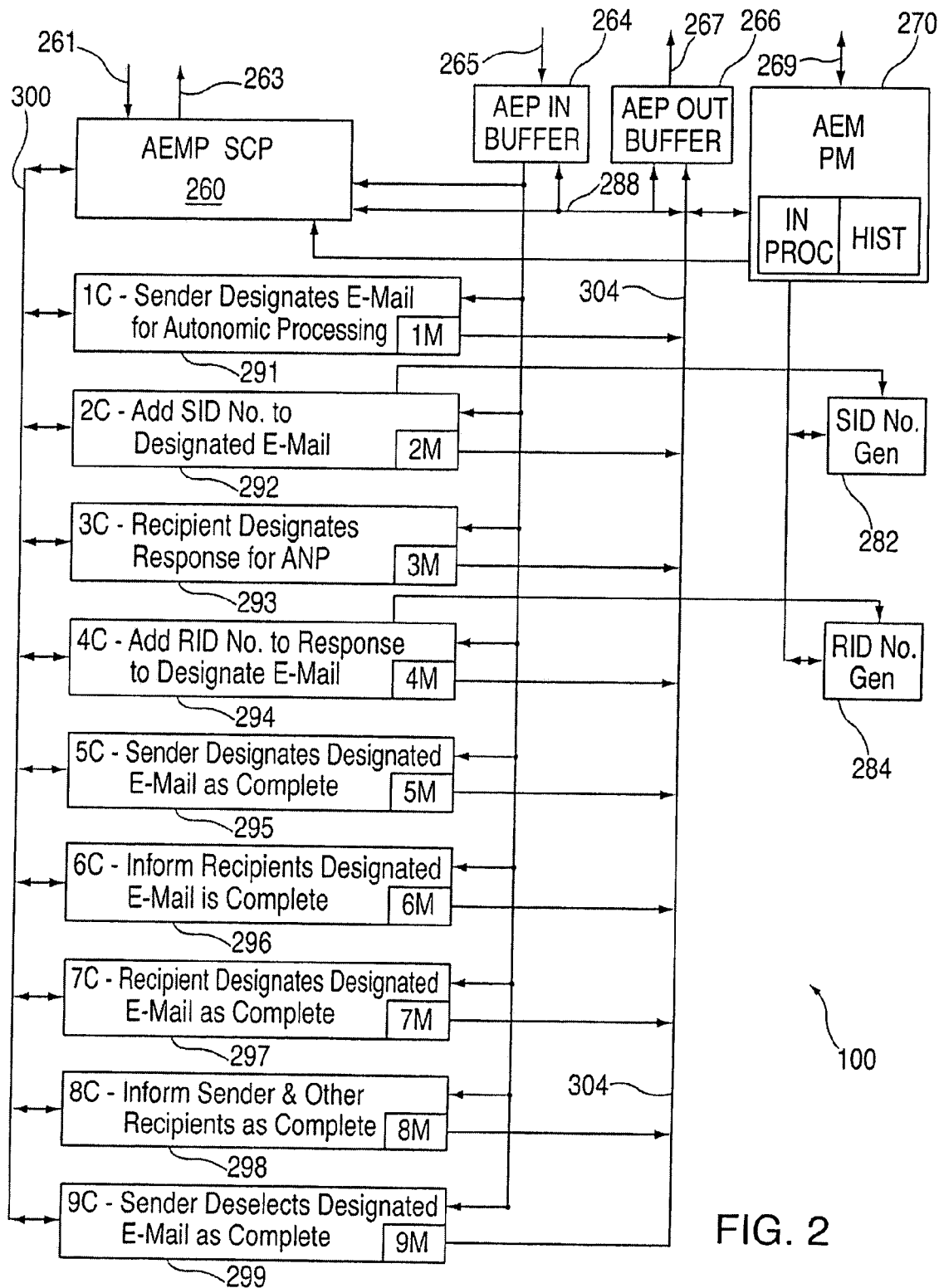
FIG. 2 is a detailed block diagram of one possible embodiment of the core of the autonomic e-mail processing system of the present invention, usable in the FIG. 1 environment, showing typical components and paths of interaction therebetween and one form for an interface with an existing e-mail server system.

FIG. 2 shows further details of the core 100 of the autonomic e-mail processing system of the present invention, which may also be called the autonomic e-mail processing management system (AEMPM system) and various parts and components thereof. Management system 100 includes an autonomic e-mail processing (AEMP) supervisory control program (SCP) 260, which supervises the operation of the rest of the AEPM system. System 100 also includes AEP input buffers 264 and AEP output buffers 266 to provide temporary storage of control instructions and e-mail data moving into and out of core 200. Control and timing information is into to SCP 260 through suitable paths such as line 261 and out of SCP 260 through suitable paths such as line 263. Incoming e-mail data is received in input buffer 264 in suitable packets over paths represented by line 265, and outgoing e-mail data is shipped out of output buffer 266 in suitable packets over paths represented by 267. If desired, autonomic e-mail identification and/or reporting or statistical information stored in memory 270 may be shipped into and out in suitable packets over path 269.

Memory 270 of core 100 is the main memory for certain key autonomic e-mail processing data used for autonomic e-mail processes. The key data includes the unique ID numbers and status of the autonomic email messages. In this regard, the AEMP main memory 270 may include data structures or portions of files devoted to tracking the status of the autonomic e-mail messages and their associated unique autonomic identification numbers. Memory 270 may be physically separate from other e-mail memory, such as the mass storage memory 78 and e-mail file system 92, or it may be integrated into and from part of the memory of the main e-mail system. It is shown here in FIG. 2 for convenient reference. Memory 270 records or remembers the particular state of out of the several possible states that each autonomic e-mail message may be in. There are at least four states, and these are: (1) in progress (that is being worked on by the core); (2) in process (meaning that the sender and recipients still regard as not yet completed); and (3) completed by one or more recipients, and (4) completed by the sender. Note that a sender or recipient may consider an autonomic e-mail message to be "completed" either because its request or task was finished or has been canceled). Additional information can be gathered, if desired, such as the age of autonomic e-mail message, how long to expiration, how many recipients have responded, and the like.

Core 100 also includes sending identification number (SID No.) generator 282 and response identification number (SID No.) generator 284. These generators are used to provide unique numbers used by other components in the core to help track and distinguish the various autonomic e-mail messages (including responses) from one another. The previous autonomic tracking numbers generated, or just the last number generated (if the numbers are generated sequentially) may be stored in any suitable location for future reference, including memory locations in AEP main memory 270. Similarly, statistics relevant to reports on the usage and performance of overall autonomic e-mail processing system may be stored in various locations with memory 270 if desired.

SCP 260 provides control instructions, sequence and timing information to input buffer 264, output buffer 266, and main memory 270 over suitable communication paths 288. SCP 260 sends and receives control and timing information first through ninth program components 1C through 9C (also designated by reference numerals 291 through 299) bidirectionally as indicated by vertical communications line 300 and the ten attached horizontal bidirectional communications lines on the left side of FIG. 2. Needed incoming data is transferred as needed from the input buffer 264 to the components 291 through 299 via the data paths represented by vertical line 302 and the ten attached horizontal lines. Similarly, instructions and/or data output from any of the program components 291 through 299 or from SCP 260 are sent to output buffer via suitable paths represented by vertical line 304 and the ten attached horizontal lines. As will be further explained, each component 291-299 sends certain information out of suitable associated means 1M through 9M respectively associated therewith as shown. These means are means for instructing, transmitting, sending or notifying, as will now be explained.

The first through sixth program components 291 through 296 have already been described in Summary above, and a portion of that discussion is repeated here for convenience.

The first program component 291 enables a sender of an e-mail message to designate a first e-mail message for autonomic processing. The first e-mail message has at least an address portion which identifies a plurality of intended recipients and a note portion which contains information to be sent to the intended recipients of the e-mail. The first program component 291 includes means 1M that causes to be displayed a first indicator that is at least temporarily associated with the first e-mail message and is visually discernable by the sender. At least a portion of the first indicator is operable to be selected by the sender in order to designate the first e-mail message for autonomic processing. The first indicator may include a radio button.

The second program component 292 associates the first e-mail message designated for autonomic processing with a unique sending identification number within the autonomic processing system 100. This unique sending identification number is generated by generator 282. The second component 292 includes second means for causing to be displayed a second indicator that is at least temporarily associated with the first e-mail message, is visually discernable by the sender, and displays a representation associated with at least part of the unique sending identification number associated with the first e-mail message. The second indicator includes an area for displaying a string of characters, with at least a plurality of characters being selected from a group of characters consisting of letters, numbers, punctuation marks and symbols.

The third program component 293 enables the intended recipients of the e-mail message to indicate that an autonomic response is being sent in response to the first e-mail message. The third program component 293 includes third means 3M for causing to be displayed a plurality of third indicators that are each at least temporarily associated with the first e-mail message and visually discernable by at least a plurality of recipients of the first e-mail message, each on their own respective screen. The third indicators are respectively operable to be selected by such recipients to designate their respective response to the first e-mail message as an autonomic response. The third indicators may each include a radio button.

The fourth component 294 identifies each autonomic response to the first e-mail message by associating it with a responding identification number (RID No.) that in combination with the unique sending identification number for first e-mail message forms a combination identification number that is unique within the autonomic processing system. The fourth component 294 includes fourth means 4M for causing to be displayed a plurality of fourth indicators each associated with a respective autonomic response to the first e-mail message and visually discernable by at least the sender of the first e-mail message. Each such fourth indicator is operable to display a representation associated with at least part of the unique combination identification number associated with that autonomic response. The fourth indicators each may include an area for displaying a string of characters, with at least a plurality of characters being selected from a group of characters consisting of letters, numbers, punctuation marks and symbols.

The fifth component 295 enables the sender of the first e-mail message to designate that the processing of the first e-mail message has been completed. The fifth component 295 includes fifth means 5M for causing to be displayed a fifth indicator at least temporarily associated with the first e-mail message and visually discernable by the sender. The fifth indicator is operable to have at least a portion thereof be selected by the sender in order to designate that the autonomic processing for the first e-mail message has been completed. The fifth indicator may include a radio button.

The sixth program component 296 causes at least a plurality of the intended recipients to be informed that the processing of the first e-mail message has been completed. The sixth component 296 includes sixth means 6M for causing to be displayed a plurality of sixth indicators associated at least temporarily with at least the first e-mail message and visually discernable by at least the sender and a plurality of the intended recipients, each on their own respective screen. The sixth indicators are each operable to display a representation indicating that the processing of the first e-mail message is completed. The sixth indicators may each include an area for displaying a string of characters, like the fourth indicators.

The seventh program component 297 enables an intended recipient of the first e-mail message that is responding thereto to indicate that the processing of the first e-mail message has been completed. The seventh program component 297 includes means 7M for causing to be displayed a plurality of seventh indicators at least temporarily associated with the first e-mail message and visually discernable by a plurality of the intended recipients, each on their own respective screen. The seventh indicators each are operable to have at least a portion thereof selected by its respective intended recipient in order to designate that the autonomic processing for the first e-mail message is considered, by that recipient, to be completed. The seventh indicators may each include a radio button.

The eighth program component 298 causes at least a plurality of the intended recipients to be informed that the processing of the first e-mail message is considered, by at least one of the recipients, to be completed. The eighth component 298 includes means 8M for causing to be displayed a plurality of eighth indicators associated at least temporarily with at least the first e-mail message and visually discernable by at least the sender and a plurality of the intended recipients, each on their own respective screen. The eighth indicators each are operable to display a representation indicating that the processing of the first e-mail message is considered, by a recipient, to be completed. The eighth indicators each may include an area for displaying a representation of the identity of the recipient who considered the processing of the first e-mail message to be completed.

The ninth program component 299 allows the sender of the first e-mail message to deselect a selection made by an intended recipient via the seventh component. The ninth component 299 includes a third radio button that the sender of the first e-mail message can select in order to deselect the "Completed Yet" selection made by an intended recipient.

Having described the various components of the management system 100, it is time to review in more detail the functionality of the autonomic e-mail processing systems and methods of the present invention. In accordance with an exemplary embodiment of the present invention, the originator of an e-mail requests that a recipient of the e-mail either provide some information to the originator (or a party designated by the originator) or perform some type of a task. The message of such an e-mail can be described as containing a to-do item or a to-do message. When a recipient provides the requested information (or indicates definitively it does not exist) or performs the requested task (or indicates definitively that the task need not be performed), the to-do item can be described as having been resolved, performed or satisfied. For convenience we shall say that the e-mail request or task is deemed "completed" in any of these situations.

The present invention is intended to be preferably used with e-mails that the originator of a to-do e-mail sends to a plurality of users such as a group (which group may be specified in a distribution list) and one or more of the users, but not all of the users, will be required to (or are expected to) resolve the to-do item in the e-mail message.

In light of the limitations associated with existing e-mail systems, the present invention provides preferably a radio button which the originator of an e-mail selects to indicate that an e-mail is one that is capable of being autonomically processed because that e-mail contains a to-do item which is a request for information or request that a certain task be performed by one (or more) of the recipients of the e-mail. Typically, e-mails which will be selected for autonomic processing are sent to several recipients, in other words a group of recipients. In some cases, any one of the members of the recipient group can handle or resolve the to-do item. In other cases, only one of the recipients can handle or resolve the to-do item, but there is a need to keep the others informed about the status of the to-do item.

The autonomic system provides an identification number to the e-mails that have been designated for autonomic processing. The invention uses this number to track and process related e-mails. Related e-mails include each instance of the original e-mail message sent to the distribution list and any e-mails that reference the original e-mail by including sending the identification number assigned by the autonomic e-mail processing system to the original e-mail. Thus, these related e-mails may include all instances of the e-mail sent to the users of the distribution list, any e-mails that reply to the original e-mail message, any e-mails that reference the original e-mail message, or any email sent by a recipient of the email, sent to the originator of the e-mail, and any e-mails sent by the recipients of the original e-mail to one another.

In another embodiment of the invention, there is a document tracing overview function or component which keeps track of who has picked up notes which reside in one's in-box, and optionally at what point in time. Thus, the user of the e-mail system may obtain information about what happened with e-mail messages which resided in his or her in-box. At this point, an exemplary sequence of operations will be reviewed with conjunction with the process flow diagrams of FIGS. 3 and 4.

Figure 3:
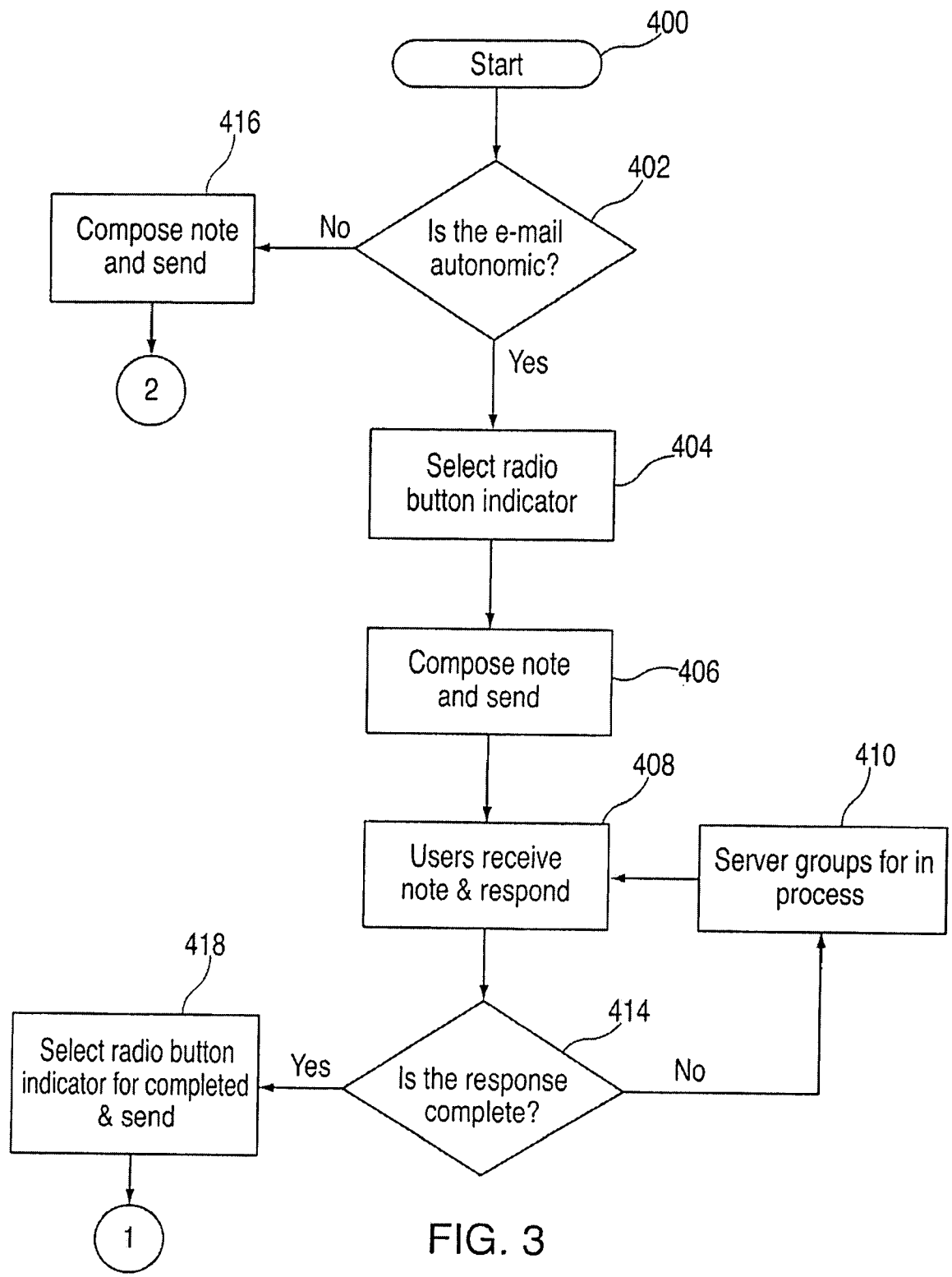
FIG. 3 is a flowchart showing basic processes involved in the autonomic processing an e-mail message in accordance with the methods of the present invention.

FIG. 3 shows a logic flow diagram for implementation of a user receiving an autonomic e-mail, responding to it, and indicating that the to-do item has been handled and resolved. The process starts at box 400. As the first step in the autonomic e-mail processing system, the originator of an e-mail determines whether this is an e-mail that is suitable for autonomic processing, as shown in decision box 402. As noted earlier, generally the user will indicate that an e-mail can be autonomically processed when the e-mail contains a to-do item, which is an item requesting information or the performance of some task, which is sent to a group of recipients, where one or more of the recipients will respond to the to-do item. (The autonomic processing system also works with to-do items that are sent to only one recipient.) If the e-mail is not of the type that is suitable for autonomic processing, the originator composes the text or note portion of the e-mail and sends it as it would be sent in a system not using autonomic processing, as shown in block 416 of FIG. 1.

The originator of an e-mail message indicates that the message may be processed autonomically by selecting, as shown in box 404 of FIG. 3, the autonomic processing button which may be a radio button or any other suitable indicator. The originator of the e-mail then composes the note to be included in the text of the e-mail, as shown in box 406, and sends it to a one or more recipients, as shown in box 406 of FIG. 3.

When the e-mail system detects an e-mail that is about to be sent that has been designated for autonomic processing, it generates a sending identification (SID) number and attaches that identification number that e-mail and to each of the e-mails sent to the recipient group. If desired, each recipient may be shown all or part of the SID number as part of or adjacent to the autonomic e-mail he or she receives.

If a recipient of the e-mail selected for autonomic processing decides to respond to the e-mail, the recipient so indicates by selecting a second indicator. The system then automatically generates a second identification number that may be used as a suffix to the SID number generated for the e-mail sent by the originator.

Once a recipient indicates that he or she is responding to the e-mail autonomically, that recipient will then determine (and preferably is asked to determine) when the to-do item has been satisfactorily completed, as shown in decision box 414. The recipient will generate a response that will be attached to the autonomic e-mail and sent as a response to the originator and (optionally) all other recipients in the group. The recipient completing the to-do item will select the completed button, which may also be a radio button indicator, to indicate to the system that the to-do item has been completed, as shown in block 418.

The originator of the e-mail is sent a copy of that response and can thus determine whether the response is sufficient. The originator may elect to confirm or deselect the "completed" choice made by the recipient, through a "Completed?" button or other similar indicator. If the sender/originator selects this button to change the e-mail's completed status, the e-mail grouped by the identification number associated with the e-mail will be grouped with similar e-mails under a first "in process" heading. If the heading is not changed (or optionally if it is confirmed), As shown in block 410 of FIG. 3, if the system has generated a suffix for one of the e-mails and no recipient has indicated that the response to the e-mail has been completed, then the system will group or mark the e-mails with a label that indicates that one of the recipients has decided to handle the to-do item contained in the e-mail. The preferred label is "In Process Autonomic E-Mail." The label and/or grouping indicates to the other recipients of the e-mail that at least one of the recipients is responding to the e-mail. Each group of e-mail indicated by the same prefix is grouped by having the e-mail with the prefix and no suffixes indented to the right from the e-mail with the same prefixes and different suffixes. Once the to-do item has been completed, the e-mail server sends a response to all of the recipients of the original e-mail to this effect, which may be in the form of an attachment to an e-mail.

Figure 4:
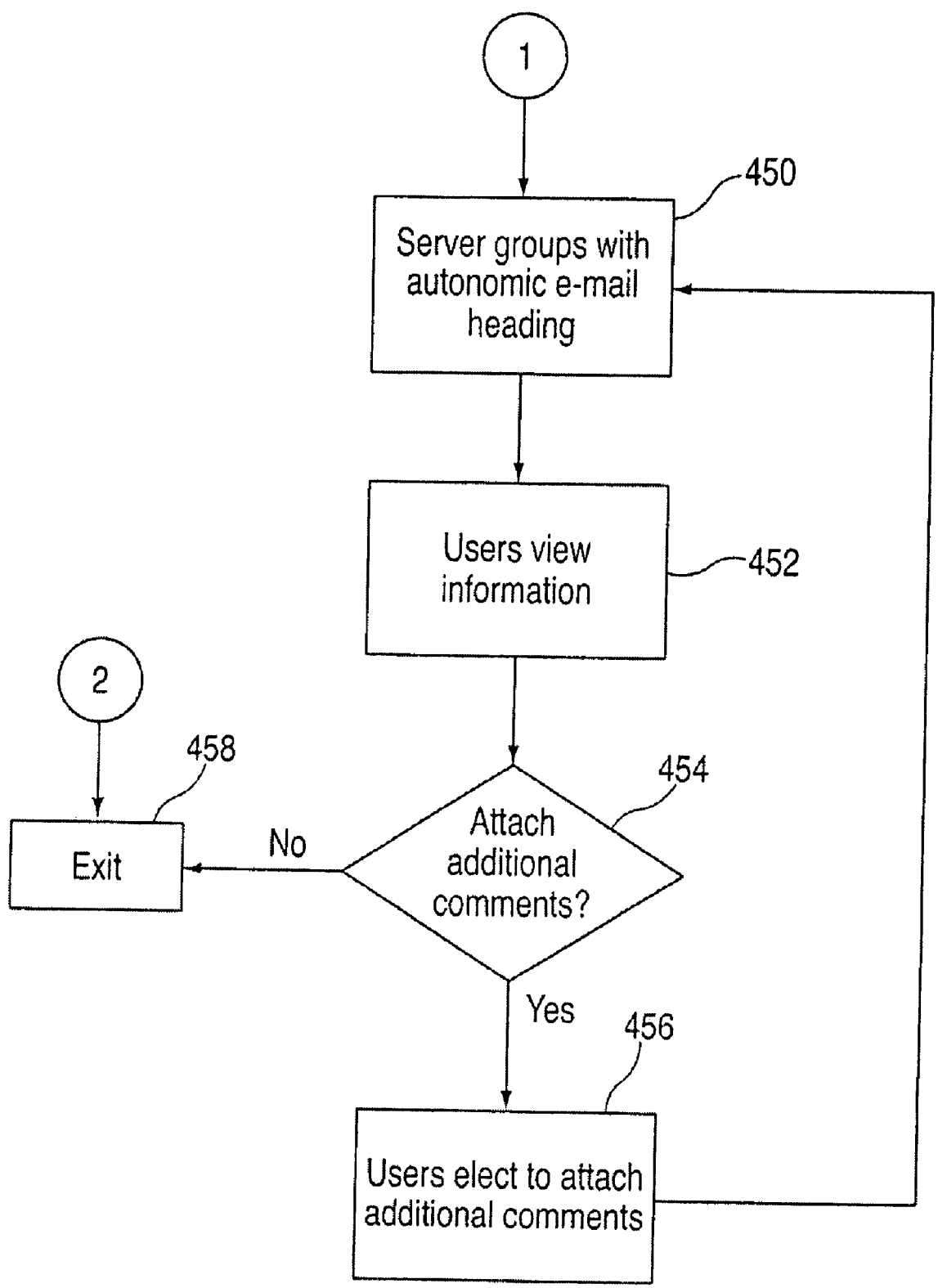
FIG. 4 is a flowchart showing how the system of the present invention sends an autonomic e-mail to various server groups.

As shown in FIG. 4, the e-mail response sent by the recipient who answered the e-mail will be sent to the e-mail server as shown in block 450. The e-mail is grouped under the appropriate autonomic e-mail heading, according to the prefix number of the e-mail and then the suffix number of the e-mail. The grouped e-mail is first listed under the heading that is associated with completed autonomic e-mail which does not need to be processed or responded to by any other member of the recipient group.

The e-mail server then groups the completed autonomic e-mail in a separate repository in each user's in-box. The completed e-mail is moved from the recipient's in-box to a separate repository for that user preferably designated "Completed Autonomic E-mail" or under some other heading which suggests the repository contains such e-mail.

Each group of e-mail identified by the same prefix is grouped by having the e-mail with the prefix and no suffixes indented to the right from the e-mail with the same prefixes and different suffixes.

The various recipients can view the e-mail for informational purposes as shown in block 452. After viewing all the e-mail relating to the original request, then the user decides whether to attach a comment to the e-mail as shown in decision box 454. The server then sends such additional comments to all recipients of the e-mail sent by the originator as shown in block 456. The server will group the comments with the other e-mail related to the originating e-mail.

The process terminates when no users indicate there are additional comments to be attached as indicated in block 408.

Integration of Autonomic E-Mail Processing Software.

To implement the autonomic e-mail processing methods and systems of present invention, process software, which is composed of the software as described above and related components including any needed data structures, is written and then integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of same with reference to the flowcharts of FIGS. 5 and 6.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems are identified and compared to the list of operating systems, version numbers and network software that have been tested to work with the process software. Those operating systems, version numbers and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of same should be readily understood.

Figure 5:
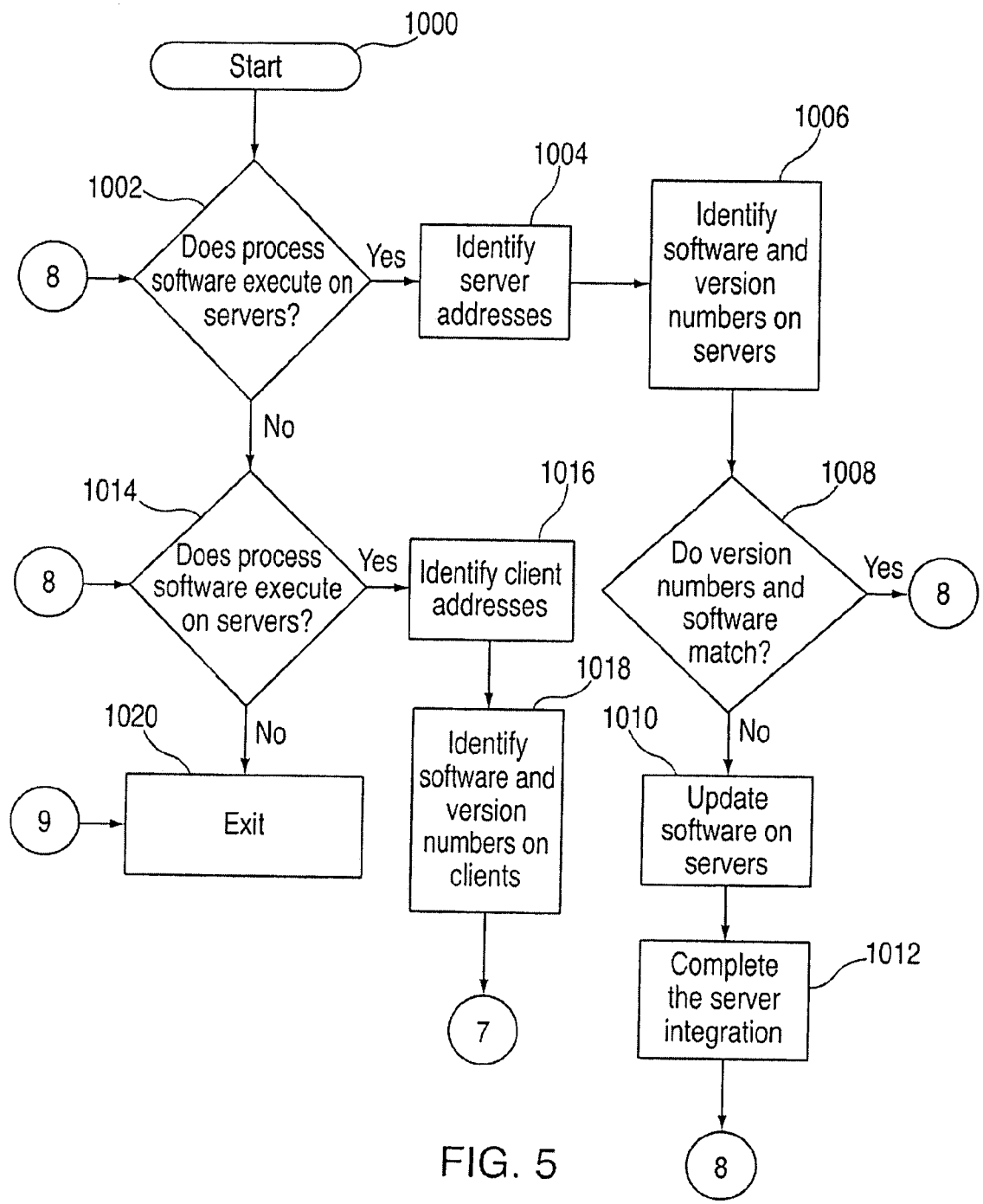
FIGS. 5 through 13 are flowcharts, where B
Figure 6:
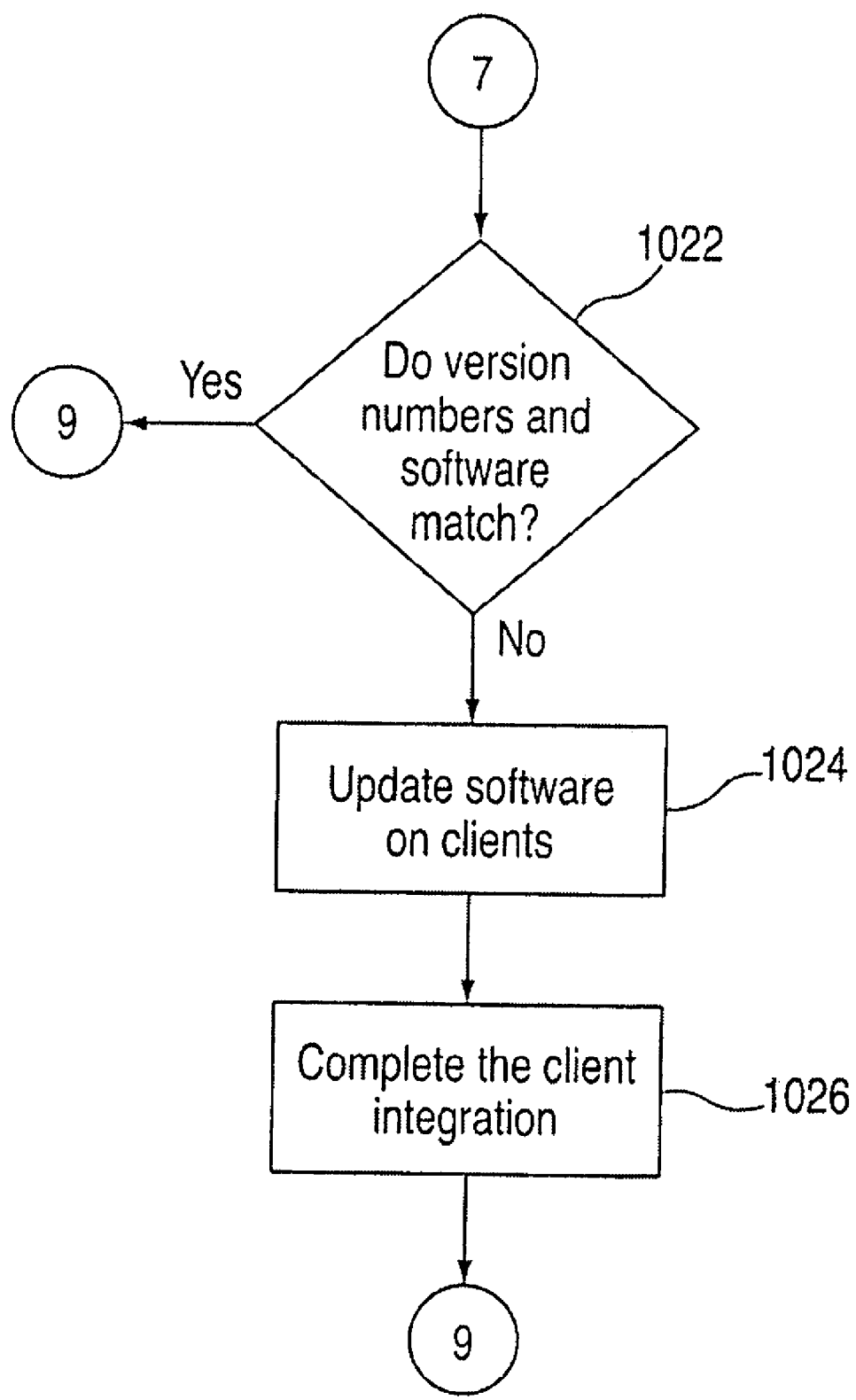

Referring to FIGS. 5 and 6, step 1000 begins the integration of the process software for implementing the autonomic e-mail processing systems and methods of the present invention. The first thing is to determine if there are any process software programs that will execute on a server or servers, as shown in box 1002. If this is not the case, then integration proceeds to determine if the process software will execute on clients as shown in box 1014. If this is the case, then the server addresses are identified as shown in box 1004. The servers are checked to see if they contain software that includes the operating system (OS), applications, and network operating systems (NOS), together with their version numbers, that have been tested with the process software as shown in box 1006. The servers are also checked to determine if there is any missing software that is required by the process software as part of the activity at box 1006. A determination is made if the version numbers match the version numbers of OS, applications and NOS that have been tested with the process software as shown in box 1008. If all of the versions match and there is no missing required software the integration continues at box 1014. If one or more of the version numbers do not match, then the unmatched versions are updated on the server or servers with the correct versions as shown in box 1010. Additionally if there is missing required software, then it is updated on the server or servers as shown in box 1010. The server integration is completed by installing the process software as shown in box 1012.

Step 1014, which follows either step 1002, 1008 or 1012, determines if there are any programs of the process software that will execute oil the clients. If no process software programs execute on the clients, the integration proceeds to box or step 1020 and exits. If this not the case, then the client addresses are identified at box 1016.

At box 1018, the clients are checked to see if they contain software that includes the operating system (OS), applications, and network operating systems (NOS) software, together with their version numbers, that have been tested with the process software. The clients are also checked at box 1018 to determine if there is any missing software that is required by the process software.

At box 1022, a determination is made if the version numbers match the version numbers of OS, applications and NOS that have been tested with the process software. If all of the versions match and there is no missing required software, then the integration proceeds to box 1020 and exits.

If one or more of the version numbers do not match, then the unmatched versions are updated on the clients with the correct versions at box or step 1024. In addition, if there is missing required software then it is updated on the clients as part of box 1024. The client integration is completed by installing the process software on the clients at box 1026. The integration proceeds to box 1020 and exits.

Deployment of Autonomic E-Mail Processing Software.

It should be well-understood that the process software for implementing the autonomic e-mail processing of the present invention may be deployed by manually loading the process software directly into the client, server and proxy computers from a suitable storage medium such as a CD, DVD, etc. It is useful to provide an overview of still other ways in which the process software may also be automatically or semi-automatically deployed into one or more computer systems. The process software may so deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of same with reference to FIGS. 7 and 8, where the deployment processes are illustrated, will be more easily understood.

Step 1050 begins the deployment of the process software. The first thing at decision box 1052 is to determine if there are any programs that will reside on a server or servers when the process software is executed. If the answer is "yes," then the servers that will contain the executables are identified, as indicated at box 1088 in FIG. 8. The process software for the server or servers is transferred directly to the servers' storage via FTP or some other protocol or by copying though the use of a shared file system at box 1090. The process software is then installed on the servers as indicated at box 1092.

Figure 7:
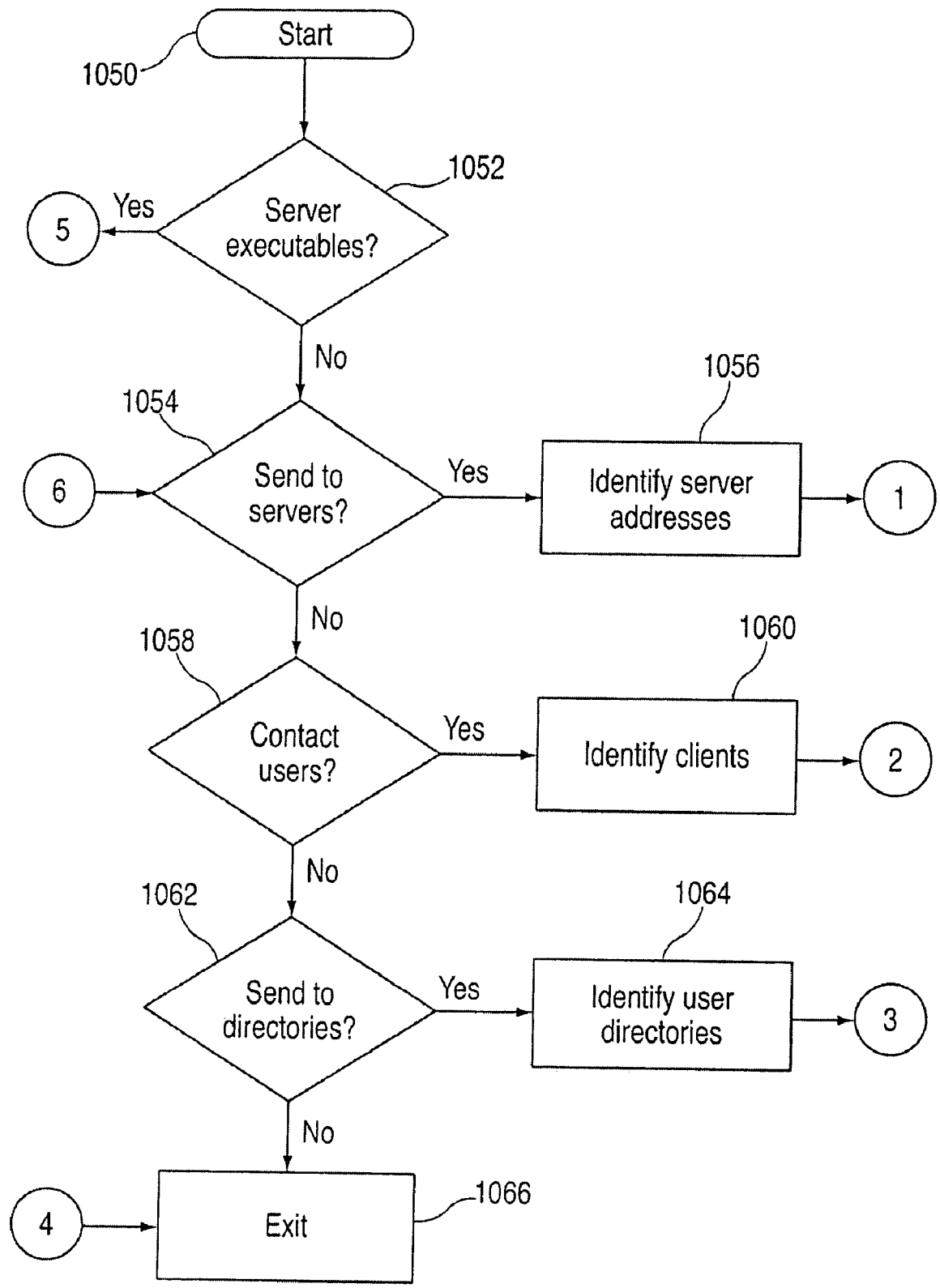
Figure 8:
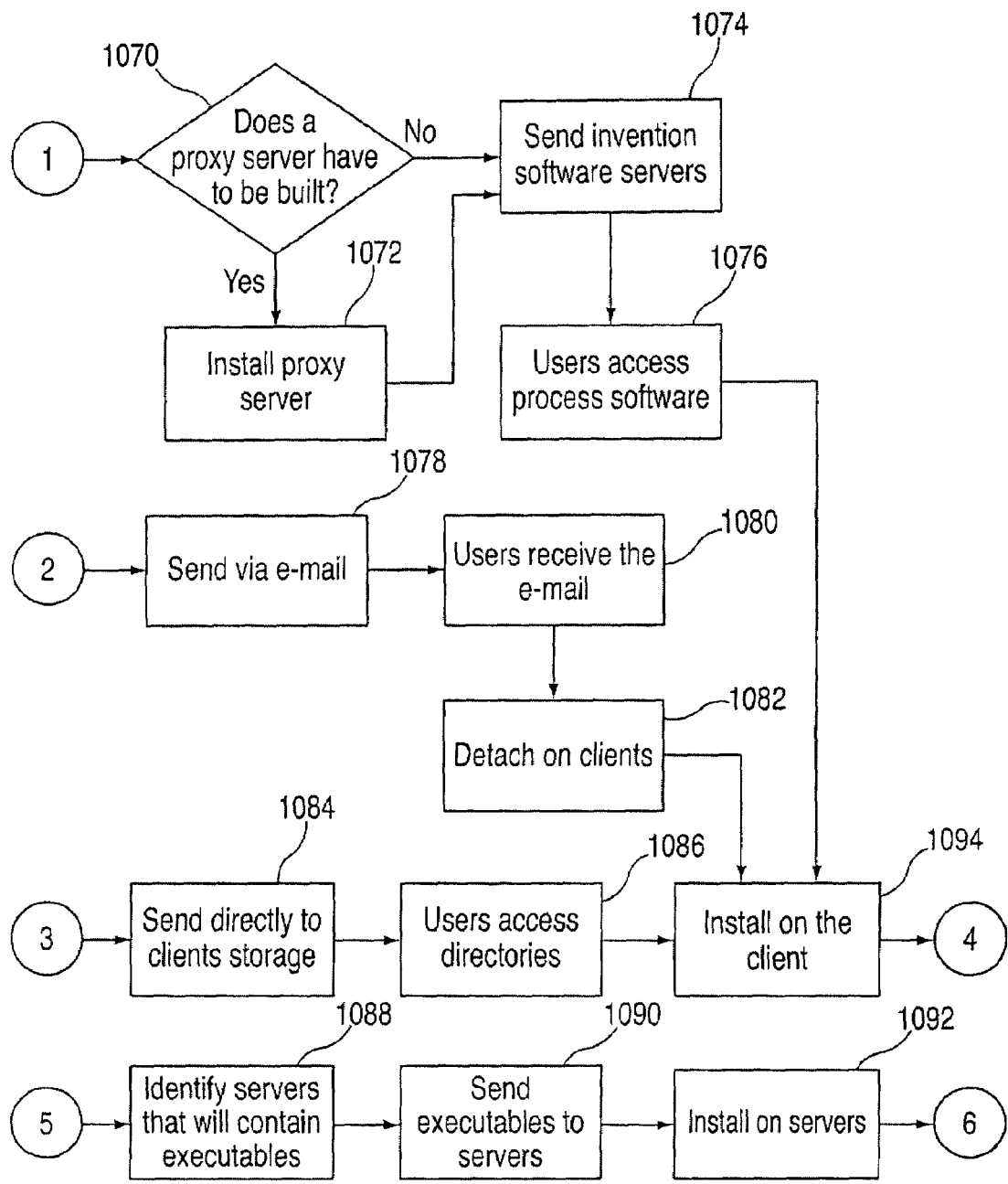

Next, as shown at decision box 1054 in FIG. 7, a determination is made on whether the process software is to be deployed by having users access the process software on a server or servers. If the users are to access the process software on servers, then the server addresses that will store the process software are identified as indicated at box 1056.

Next, as shown at decision box 1070, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at box 1072. Next, the process software for implementing the present invention is sent to the servers, as indicated in box 1074 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers, as indicated at box 1076. Another alternative is to have the servers automatically copy the process software to each client and then run the installation program for the process software at each client computer. Either way, as indicated at box 1094, the user computer executes or causes to be executed the program that installs the process software on the client computer, then the process exits at box 1066.

Continuing now at decision diamond 1058 in FIG. 7, a determination is made as to whether the process software is to be deployed by sending the process software to users via e-mail. If the answer is yes, then, as indicated at box 1060, the set of users where the process software will be deployed are identified together with the addresses of the user client computers. The process software is sent via e-mail in step 1078 (shown in FIG. 8) to each of the users' client computers. Then, as indicated in box 1080 the users then receive the e-mail, and then detach the process software from the e-mail to a directory on their client computers as indicated in box 1082. The user then executes the program that installs the process software on his client computer as indicated at box 1094, and then exits the process at box 1066.

Continuing at decision diamond 1062 (see bottom of FIG. 7), a determination is made on whether to the process software will be sent directly to user directories on their client computers. If so, the user directories are identified, as indicated at box 1064. Then, the process software is transferred directly to the identified directory on the user's client computer, as indicated in box 1084. This can be done in several ways such as but not limited to sharing of the file system directories and then copying from the sender's file system to the recipient user's file system or alternatively using a transfer protocol such as File Transfer Protocol (FTP). Next, the users access the directories on their client file systems, as indicated in box 1086, in preparation for installing the process software. Finally, the user executes the program that installs the process software on his client computer as indicated in box 1094 and then exits the process at box 1066.

Use of Virtual Private Networks for Autonomic E-Mail Processing Software.

The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such instances, the lifetime of the VPN is often limited to a given period of time or to a given number of deployments based on an amount paid.

The process software may be deployed, accessed and executed through either a remote-access VPN or a site-to-site VPN. When using a remote-access VPN, the process software is typically deployed, accessed and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL or wireless modem to reach the NAS and use their VPN client software to access the corporate network and to access, download and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

Figure 10:
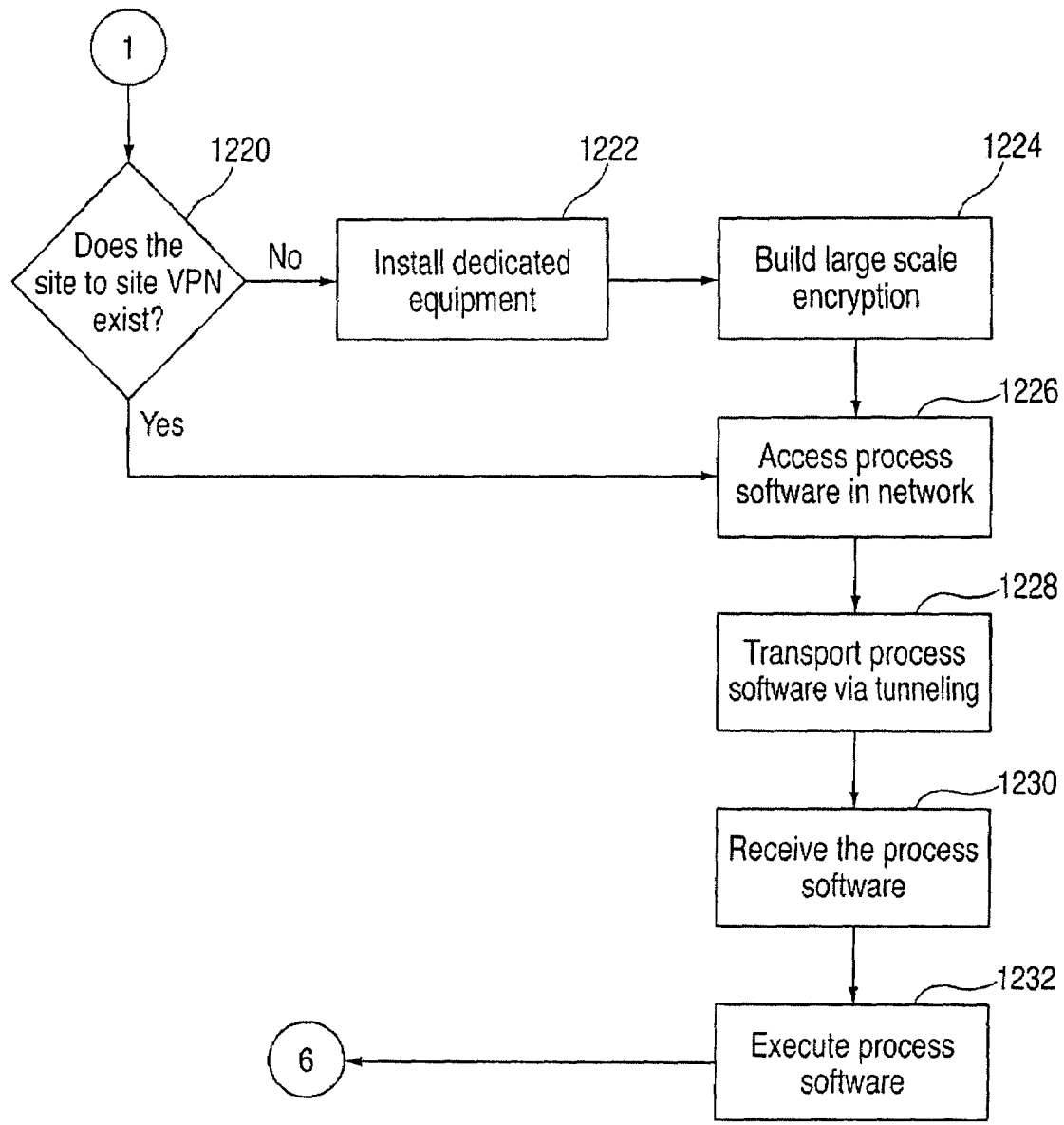
Figure 11:
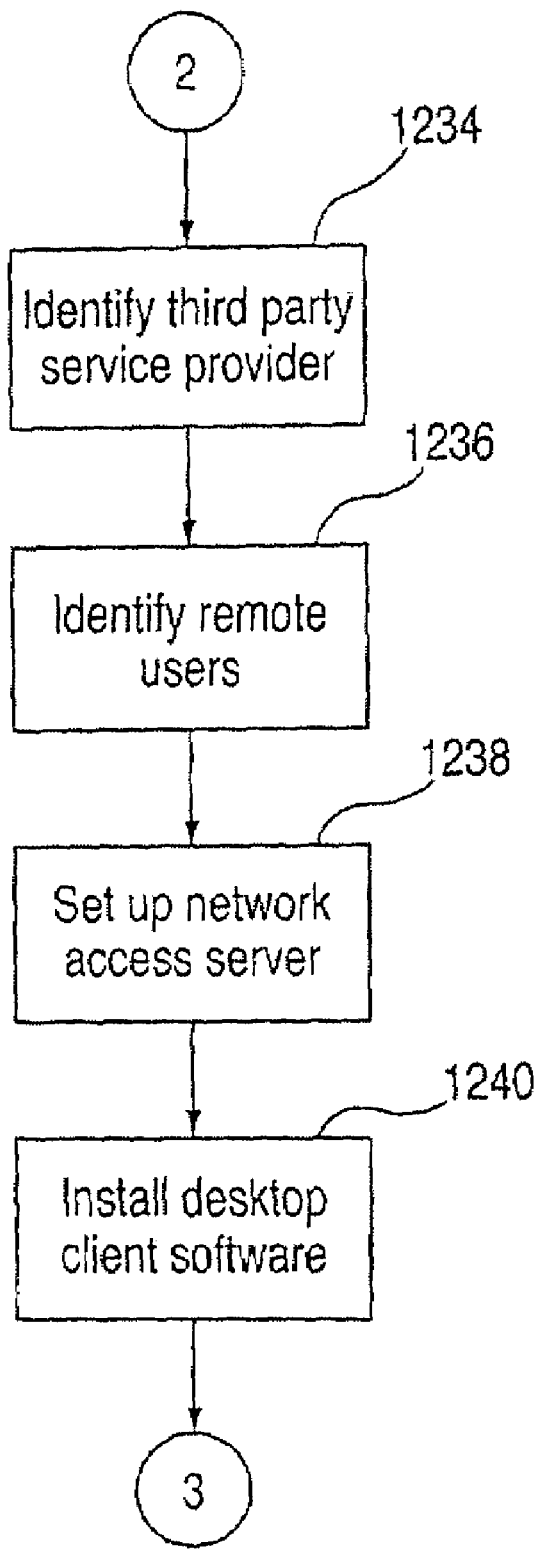

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 9 through 11 should be more readily understood.

Figure 9:
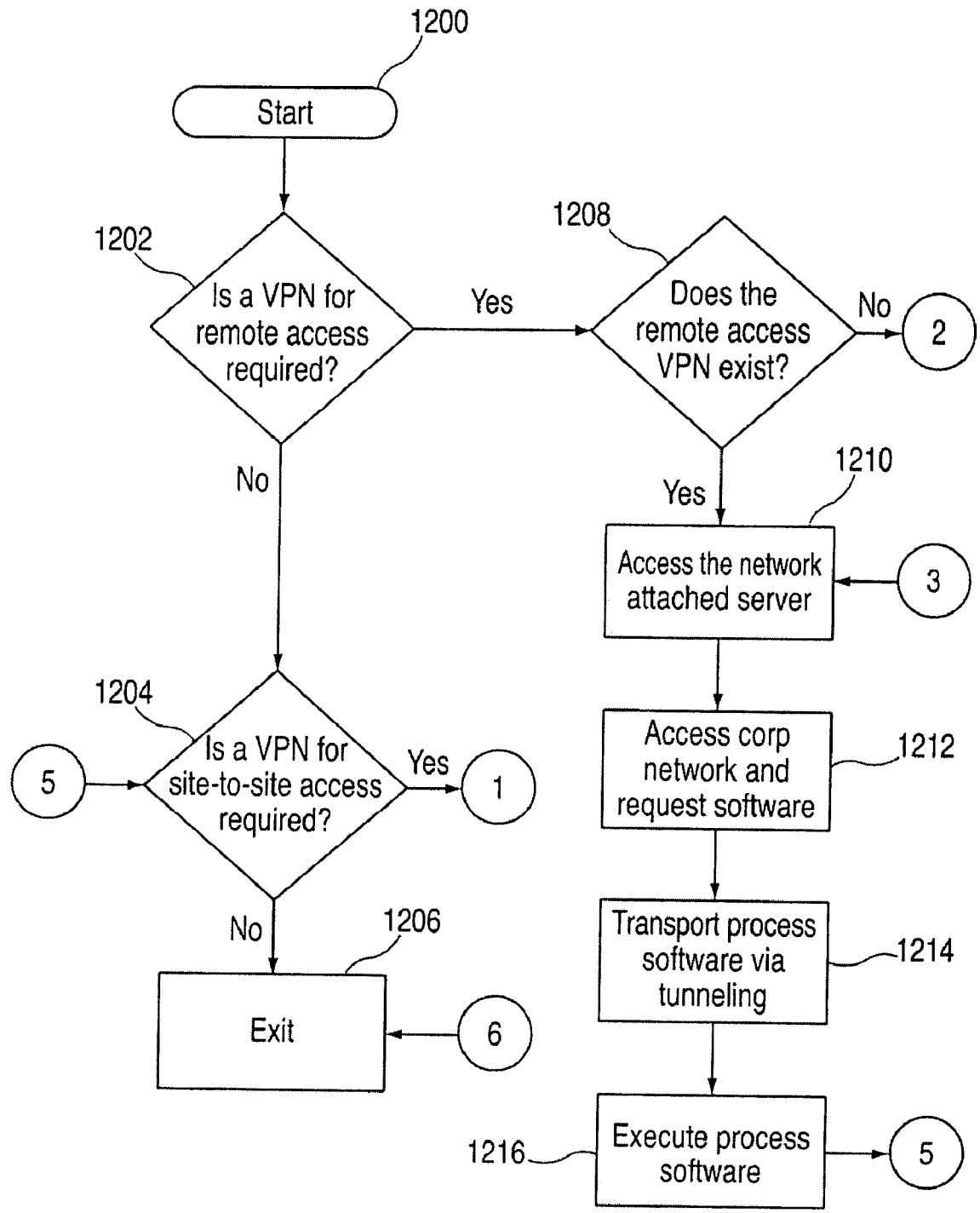

Step 1200 in FIG. 9 begins the virtual private network (VPN) process. A determination is made at decision box 1202 to see if a VPN for remote access is required. If it is not required, then flow proceeds to decision box 1204. If it is required, then flow proceeds to box 1208 where a determination is made if as to whether a remote access VPN exists that is available for use.

If a remote access VPN does exist, then flow proceeds to box 1210 in FIG. 7. Otherwise flow proceeds to box 1234 (see top of FIG. 11), where a third-party provider that will provide the secure, encrypted connections between the company's private network and the company's remote users are identified. Next, as indicated in box 1236, the company's remote users are identified. Then, as indicated at box 1238, identified third party provider then sets up a network access server (NAS). The NAS allows the remote users to dial a phone number (typically a toll-free number) or attach directly via a cable, DSL, wireless or other modem to access, download and install the desktop client software for the remote-access VPN as indicated att box 1240.

Returning to box 1210 in FIG. 9, after the remote access VPN has been built or if it been previously installed, the remote users can then access the process software by dialing into the NAS or attaching directly via a cable, DSL, or other modem into the NAS. This step at box 1210 allows entry into the corporate network, as indicated at box 1212, where the process software may be accessed. The process software is transported to the remote user's desktop computer over the network via tunneling. During tunneling, see box 1214, the process software is divided into packets and each packet including the data and protocol for that packet, is placed within another packet. When the process software arrives at the remote user's desktop computer, it is removed from the packets, reconstituted and then may be executed on the remote users desktop, as indicated at box 1216.

Returning now to decision diamond 1204 in FIG. 9, a determination is made to see if a VPN for site-to-site access is required. If it is not required, then flow proceeds to the exit at box 1206. If it is required, flow proceeds to box decision diamond 1220 (see top of FIG. 8) to determine if the site-to-site VPN exists. If it does exist, then flow proceeds to box 1226. If it does not exist, then as indicated at box 1222, dedicated equipment required to establish a site-to-site VPN is installed. Then build the large scale encryption into the VPN 1224.

After the site-to-site VPN has been built or if it had been previously established, the users access the process software via the VPN as indicated in box 1226. Next, the process software is transported to the site users over the network via tunneling as indicated in box 1228. As previously explained, the process software is divided into packets and each packet including the data and protocol is placed within another packet, as indicated in box 1230. When the process software arrives at the remote user's desktop, it is removed from the packets, reconstituted and is executed on the site users desktop 1232. Then the process proceeds to box 1206 and exits.

On Demand Computing for Autonomic E-Mail Processing Software.

Figure 12:
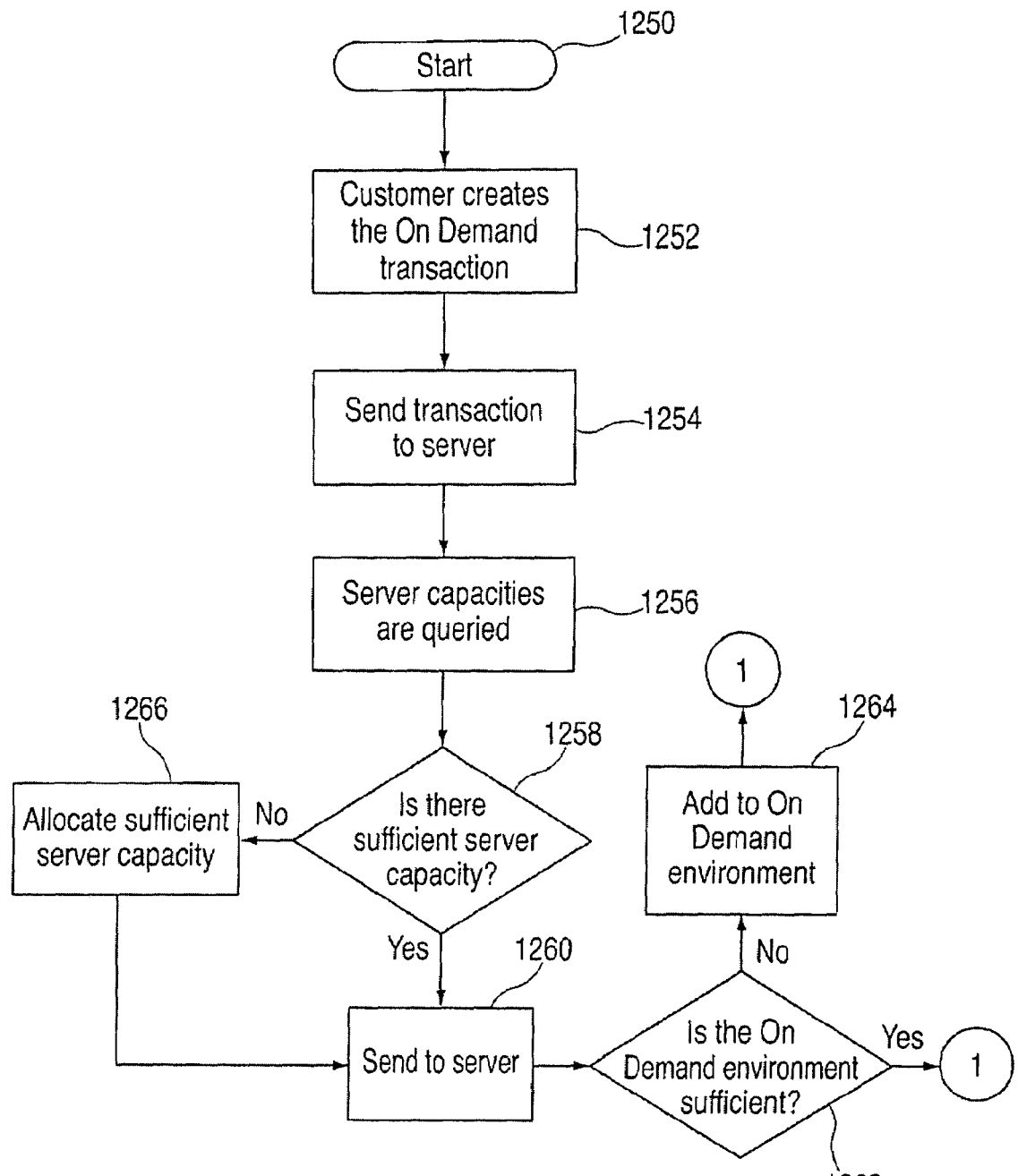
Figure 13:
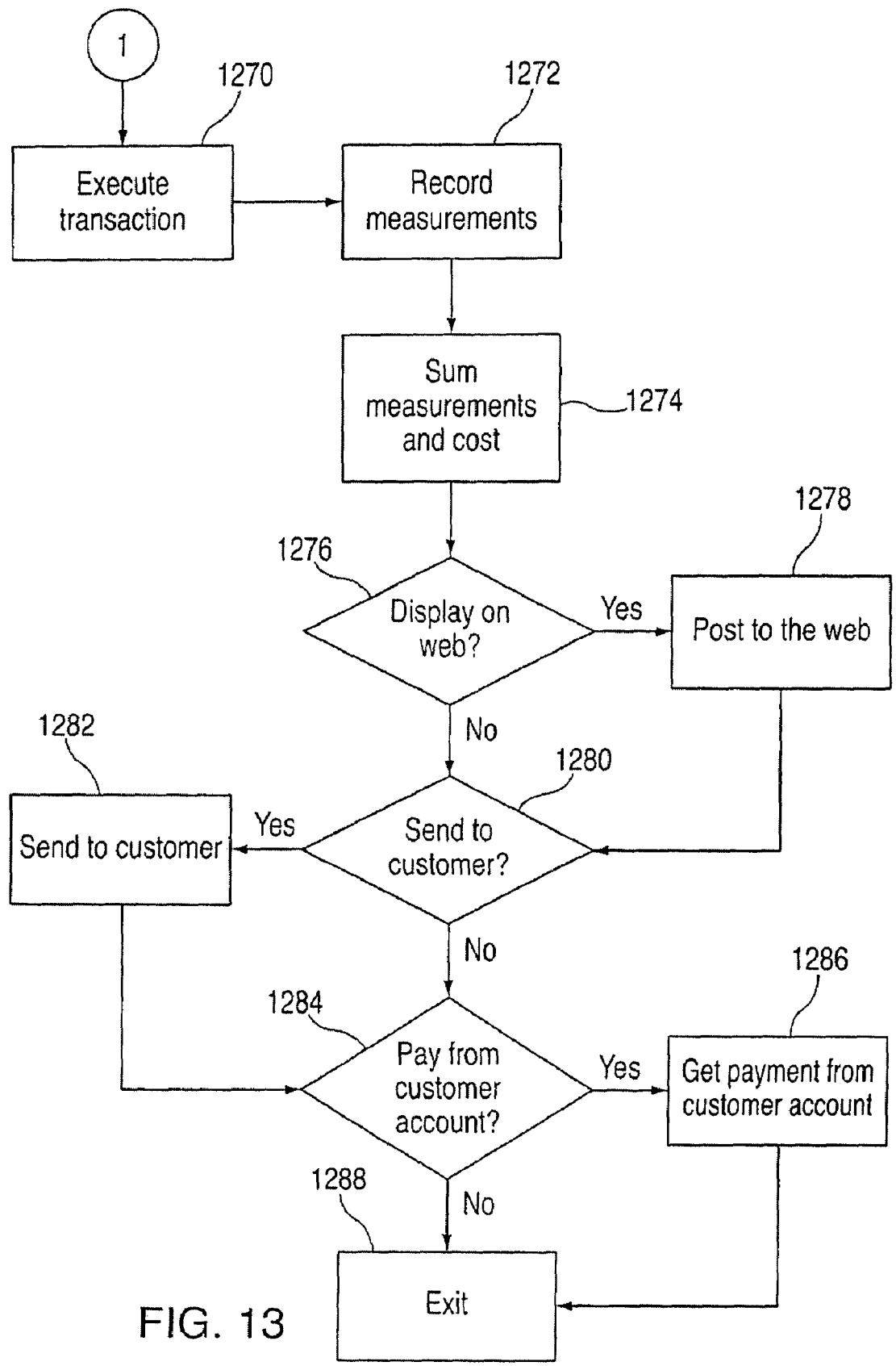

The process software for implementing the autonomic e-mail processing of the present invention may be shared., that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the autonomic e-mail processing software will now be provided, followed by a more detailed description of same made with reference to the flowcharts of FIGS. 12 and 13.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, the following detailed description of same with reference to FIGS. 12 and 13, where the on demand processes are illustrated, will be more easily understood.

Step 1250 begins the On Demand process. A transaction is created than contains the unique customer identification, the requested service type and any service parameters that further specify the type of service as indicated in box 1252. The transaction is then sent to the main server as shown in box 1254. In an On Demand environment the main server can initially be the only server, then as capacity is consumed other servers are added to the On Demand environment.

The server central processing unit (CPU) capacities in the On Demand environment are queried as indicated in box 1256. The CPU requirement of the transaction is estimated, then the servers available CPU capacity in the On Demand environment are compared to the transaction CPU requirement to see if there is sufficient CPU available capacity in any server to process the transaction as indicated in decision box 1258. If there is not sufficient server CPU available capacity, then additional server CPU capacity is allocated to process the transaction as indicated in box 1266. If there was already sufficient Available CPU capacity then the transaction is sent to a selected server as indicated in box 1260.

Before executing the transaction, a check is made of the remaining On Demand environment to determine if the environment has sufficient available capacity for processing the transaction as indicated in decision box 1262. This environment capacity consists of such things as but not limited to network bandwidth, processor memory, storage, etc. If there is not sufficient available capacity, then capacity will be added to the On Demand environment as indicated in box 1264. Next the required software to process the transaction is accessed, loaded into memory, then the transaction is executed as indicated in box 1270.

The usage measurements are recorded as indicated in box 1272. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer as indicated in box 1274.

If the customer has requested that the On Demand costs be posted to a web site as indicated in decision diamond 1276, then they are posted to a web site as indicated in box 1278. If the customer has requested that the On Demand costs be sent via e-mail to a customer address as indicated in decision diamond 1280, then they are sent to the customer via e-mail as indicated in box 1282. If the customer has requested that the On Demand costs be paid directly from a customer account as indicated in decision diamond 1284 then payment is received directly from the customer account as indicated in box 1286. The On Demand process proceeds to box 1288 and then exits.

SMTP and IMAP.

The present invention has been described with respect to an implementation based as an addition or overlay upon existing e-mail systems. Existing e-mail systems often employ one or more communication protocols, and often support Simple Mail Transfer Protocol (SMTP), an open-standards protocol widely used for transferring e-mail between points on the Internet. E-mail is often sent via SMTP and a mail handler on a local server receives the e-mail on the recipient's behalf. Once on a local server, either proprietary protocols or open standards protocols, such as IMAP or POP3 protocols are often used on the e-mail server system to allow the recipient to access and read the incoming e-mails. IMAP (Internet Message Access Protocol) is a protocol widely used for accessing e-mail from a local server. A recent version, IMAP4, is a client/server protocol in which e-mail is received and held for the recipient by the e-mail server. With IMAP4, a user (through the e-mail client) may view just the heading and the name of the sender of the e-mail and then decide whether to download the e-mail. IMAP4 also allows for the creation and manipulation of folders on the server, the deletion of the messages, and the searching through the certain parts of the stored emails or through their entire textual content, including all fields.

POP3.

Post Office Protocol 3 (POP3) is a less sophisticated protocol for e-mail systems. With POP3, the e-mail is saved for the user in his or her mail box on the e-mail server. When the user logs onto the e-mail system to read his or her e-mail, all of the previously unread e-mail is immediately downloaded to the client program on the user's computer and is no longer maintained on the server. In this regard, POP3 can be thought of as a "store-and-forward" service. The client program typically has one or more indexed files into which the received e-mail's are stored. These indexed user files typically have either flags or subindexes pointing to e-mails not yet read, e-mails already read, and e-mails designated for deletion. Whether the user's emails are stored on an e-mail server or on the user's computers, much the same functionality is often provided. The systems and methods of the present invention can be implemented in e-mail systems based on either IMAP4 or POP3 by adding suitably designed components that appropriately interact with the existing components of such e-mail systems in accordance with the teachings of the present invention.

Different Types of E-Mail Systems, Processes or Agents.

As noted above, various e-mail systems use still internal programs and databases to keep track of the e-mails that are in a user's in-box or directories or folders. Where these programs and databases reside is dependent on how the email system is implemented. The precise manner in which the components of the autonomic e-mail systems of the present invention need to be implemented depend on how in the existing e-mail systems are implemented. In order to carry out the steps of the present invention, the techniques will vary as needed to interact with these programs and databases in an existing e-mail system, and such variations are within the scope of the present invention. Also, to the extent that there are different styles of e-mails provided for in a given e-mail system, providing different programs, processes or agents to efficiently handle a particular style or type of e-mail is within the scope of the present invention.

Audio-Based "Display and Select" Systems.

In automotive vehicles, smart cell phones and certain other applications, audio speakers, a microphone and speech recognition equipment are being used to supplement or even in place of visual display screens to present information aurally, and to enable a user to select or de-select certain presented information. For example, for rather than use display screens, which may take the eyes of a person (such as driver) away from another task (such as driving), information can be presented verbally over the audio speakers and any needed choices, in response to a possible selection or menu of choices, can be made verbally through the microphone. The aural-based systems for presenting information and selecting or deselecting options or choices presented by sound should be considered, broadly speaking, to be the equivalent of presenting information visually on a screen, and using a keystroke or pointing device to make one's choice relative to what is presented on the screen, for the purposes of the present invention.

Synchronous and Asynchronous Uses.

Certain parts of the e-mail systems and methods of the present invention may be used synchronously. By "synchronous use" we mean a use where the e-mail system performs or attempts to perform certain procedures, and will not send out the commands to perform the next step in a process of the present invention until a positive confirmation is returned from the preceding step in the process. Alternatively, multiple steps or instructions may be sent out by the system of the present invention concurrently, or may be sent out at timed intervals, without waiting for response from or the completion of an earlier steps by the same or different component. These would be examples of what we characterize as an "asynchronous use" of the system and components of the present invention.

Reporting & Exceptions Activity.

An arrangement of components and memory for logging the results (or lack thereof) of the e-mail commands and/or steps of the present invention is also contemplated. It is also within the scope of the e-mail system of the present invention to have one or more subprograms, agent programs or components that provide data gathering and/or some form of statistics, for storage in an appropriate container or form, such as but not limited to a relational database, to collect information about usage of the e-mail server system and/or its various components. Specifically, data about its activities in automatically controlling access to or re-routing e-mails from primary to secondary storage systems that have been responded to but which have not yet been read by recipients, may be collected. Such reporting and exceptions programs can also count activities, including but not limited to terminations, by various users (recipients or senders) or other voluntary responses to situations, problems or other issues. The reporting of such data in turn are expected to help designers of the system of the present invention tweak various performance attributes of the systems and methods of the present invention.

Software Coding Implementations.

It should be appreciated that in a run-time environment consisting primarily of programs using object-oriented programming (OOP) techniques, the systems and methods of the present invention may be implemented as or with a component, and/or associated agent programs, for example, those routing or collecting data or maintaining a database of e-mails being processed. Further, when such components or agents are executing, they in effect become objects in such an environment. It should also be appreciated, that if desired more than one instance of any such component or agent may be provided. For example, if different e-mails are being processed because there are multiple senders who have sent out their own to-do e-mail, it may be useful to manage each within the e-mail server system of the present invention by providing an instance of key component(s) for each such to-do e-mail.

Applications Beyond Local E-Mail Systems.

The foregoing description has focused primarily upon an e-mail server system operating in the context of a local area network. Those skilled in the art should appreciate from the integration, deployment and VPN discussions above that systems and methods of the present invention are applicable to wide-area networks, and Internet-based networks, including virtual private networks. As is well-known, such distributed networks are tied together by one or more widely used communications protocols, which handle the packaging and transfer of data and control information between the gateways of the various interconnected networks.

Hardware Platforms.

Those in the art should appreciate that the systems and methods of the present invention are, in the usual software-based implementation, considered an application. The e-mail systems and methods of the present invention may be implemented as one or more applications on any suitable hardware platform(s) running under the control of any suitable operating systems. For example, in a distributed computer network environment, different components may reside on servers in different locations as well as on the user work stations Further Description Not Needed.

The systems and methods of the present invention need not be further described here since those skilled in the art, based on the teachings of the present invention, will readily understand how to implement the same. This in part is due to the widespread use of conventional e-mail systems and associated communications protocols in modern distributed computer systems, such as local area networks (LANs), wide area networks (WANs) and Internet-based virtual private networks (VPNs). Also, the widespread knowledge about and use of various messaging systems to exchange e-mails or equivalent messages between computers persons on such networks makes it unnecessary to further explain the details of those messaging processes they employ. Moreover, any suitable programming approach and any known communications and database protocols and software tools familiar to those writing e-mail software programs or messaging systems, may be used to implement the systems and methods of the present invention. These programming approaches include using relational databases and object-oriented programming components, and distributed client/server computing and communications techniques. For example, servant programs may be provided on application servers so that the thin clients can be used on the user's computers or their local area networks. As a second example, the systems and processes of the present invention may be written as a set of interrelated programs or routines in any suitable programming languages or set of languages, such as but not limited to object-oriented languages. Further, such client and server programs and/or routines may then be deployed to run under the control of any suitable management software package used on a network, if desired.

Application-Specific Coding.

The present invention has been described in part by reference to block diagrams, flow diagrams and elements of systems and steps of methods. As is well known, suitable program instructions or coding provided in software are used to turn general purpose computers and/or processors into programmed computers and/or processors to form systems capable of carrying out a specific application, such as the teachings of the present invention.

Firmware & Other Implementations.

It should be appreciated by those skilled in the art that, if desired, the systems, methods and software described herein may be implemented in part in firmware (including microcode) or hardware. Accordingly, the present invention may take the form of an embodiment including hardware and/or firmware, or an embodiment that is a combination of software, hardware and/or firmware. Further, the methods of the present invention may be carried out entirely in software, or in a combination of the software, hardware and/or firmware.

Tangible Media as an Implementation.

Also, the software or other coding employed to implement the present invention may be provided in any suitable form of computer program code embodied in tangible media, such as but not limited to floppy diskettes, CD-ROMs, hard drives, static or flash memory, gate arrays, or any other computer readable storage medium. When such computer program code or other code, containing the needed instructions, is loaded into and is ready for execution by suitable computers/processors, such programmed computers/processors become an apparatus for practicing the invention. Thus, it should be appreciated that another embodiment of the present invention is the computer program code needed for carrying out the processes of the present invention when it is embodied in a tangible medium.

Defined Terms.

The term "component" as used in connection with the systems and methods of the present invention includes but is not limited to modules, routines, subroutines, classes, objects, all or portions of client/server programs, and agent and/or proxy/stub software. Since all or portions of any component can be implemented in whole or in part as application specific integrated circuits (ASICs), including but not limited to field programmable gate arrays (FPGAs) or other forms of hardware and/or as firmware, the term "component," in its broader sense, should be understood to include ASICs as well. The term "radio button" is defined herein as being an indicator discernable by a computer user that has a plurality of states, with such state being a selected state and another such state being an unselected state. Often, radio buttons are implemented as indicators on a computer screen having only two possible states, meaning that the indicator is either selected or it is not. Also, radio buttons are often used as sets of buttons have mutually exclusive selected states. For example, if there are three, four or five buttons in a set of radio buttons displayed on particular screen, only one of the buttons in the set can be selected at any one time, which is analogous to a set of car radio buttons where only one station can be selected at any one time.

Further Variations/Additions.

The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

The invention claimed is:

1. In an e-mail system, used within an organization, a method for allowing normal users of the e-mail system who are authorized to send and receive e-mail messages to voluntarily select certain of their e-mail messages that they send for autonomic processing, and to thereafter process those selected e-mail messages autonomically, the method comprising the steps of:
　(a) providing means for a plurality of senders of e-mail messages within an organization to designate selected e-mail messages of theirs and responses thereto for autonomic processing;
　(b) designating, via a selection made by a first sender, at least a first e-mail message for autonomic processing;
　(c) identifying a plurality of intended recipients in an address portion of such first e-mail message, and entering information in a note portion of such first e-mail message;

(d) identifying the first e-mail message designated for autonomic processing within the e-mail system with a unique sending identification number;

(e) providing means for each intended recipient of such first e-mail message to indicate that an autonomic response is being sent in response thereto;

(f) identifying each autonomic response to such first e-mail message with a responding identification number that in combination with the unique sending identification number for such first e-mail message forms a combination identification number that is unique within the e-mail system;

(g) providing means to enable the sender of such first e-mail message to indicate that the processing of the first e-mail message has been completed; and (h) after the sender indicates that the processing of the first e-mail message has been completed, informing at least a plurality of the intended recipients that the processing of such first e-mail message has been completed.

2. The method of claim 1, wherein step (h) is performed by automatically moving such first e-mail message, upon being designated as completed, to a different folder within a recipient's email folder system, the different folder being designated for holding completed autonomic e-mail messages.

3. The method of claim 1, wherein step (h) is performed by automatically attaching to such first e-mail message within the in-box of the intended recipients thereof, an indicator signifying that the processing of such first e-mail message is considered to be completed.

4. The method of claim 1, wherein step (h) is performed by automatically deleting such first e-mail message from the in-boxes of at least those recipients thereof that have not yet provided a response to the first such e-mail message.

5. The method of claim 1, wherein:

step (a) includes displaying at least temporarily to the sender of an original email message a first indicator associated with such first e-mail message, the first indicator including a sender-selectable portion designating the e-mail message for autonomic processing;

step (b) includes the sender selecting the sender-selectable portion in order to designate the first e-mail message for autonomic processing;

step (c) further includes sending such first e-mail message to the plurality of intended recipients in the address portion of such first e-mail message, and the entering information part of step (c) includes requesting that an action be taken by at least one of the recipients of the first e-mail, the action being selected from a group of actions consisting of providing certain requested information, performing a specific task, making a recommendation relative to an identified subject, and providing advice on an identified subject;

step (d) includes providing at least a portion of the unique sending identification number as a part of the first e-mail message when it is sent to the intended recipients;

step (e) includes displaying at least temporarily to each intended recipient of the first e-mail message a second indicator associated with such first e-mail message, the second indicator including a recipient-selectable portion; and step (f) includes at least a first recipient selecting the recipient-selectable portion in order to designate his response to the first e-mail message as an autonomic response.

6. The method of claim 1 including the step of deploying process software for autonomic e-mail processing, the deployment comprising the steps of:

installing the process software on at least one server;

identifying server addresses for users accessing the process software on the at least one server;

installing a proxy server if needed;

sending the process software to the at least one server and copying the process software to a file system of the at least one server;

sending the process software to at least a first client computer; and executing at least the process software on the first client computer.

7. The method of claim 6 wherein the step of installing the process software further comprises:

determining if programs will reside on the at least one server when the process software is executed;

identifying the at least one server that will execute the process software; and transferring the process software to storage for the at least one server.

8. The method of claim 6 wherein the step of sending the process software to the first client computer includes having the at least one server automatically copy the process software to the first client computer, and running an installation program at the first client computer to install the process software on the first client computer.

9. The method of claim 6 wherein the step of sending at the process software to the first client computer further comprises identifying the user and the address of the first client computer.

10. The method of claim 6 wherein the step of sending the process software to the first client computer includes sending the process software to at least one directory on the first client computer.

11. The method of claim 6 wherein the step of sending the process software to the first client computer includes sending the process software to the first client computer via e-mail.

12. The method of claim 1 including integrating process software for autonomic e-mail processing, the integration comprising the steps of:

determining if the process software will execute on at least one server;

identifying an address of the at least one server;

checking the at least one server for operating systems, applications and version numbers for validation with the process software, and identifying any missing software applications for the server that are required for integration;

updating the server with respect to any operating system and application that is not validated for the process software, and providing any of the missing software application for the server required for the integration;

identifying client addresses and checking client computers for operating systems, applications, and version numbers for validation with the process software, and identifying any software applications missing from the client computers that are required for integration;

updating the client computers with respect to any operating system and application that is not validated for the process software, and providing any missing software application for the client computers required for the integration; and installing the process software on the client computers and the at least one server.

13. The method of claim 1 including on demand sharing of process software for autonomic e-mail processing, the on demand sharing comprising the steps of:

creating a transaction containing unique customer identification, requested service type, and service parameters;

sending the transaction to at least one main server;

querying the at least one main server about processing capacity associated with the server to help ensure availability of adequate resources for processing of the transaction; and allocating additional processing capacity when additional capacity appears needed to process the transaction, the additional processing capacity being selected from the group of additional capacities consisting of central processing unit capacity, processor memory capacity, network bandwidth capacity, and storage capacity.

14. The method of claim 13 further comprising the step of recording a plurality of usage measurements selected from the group of usage measurements consisting of network bandwidth, processor memory, storage, and central processing unit cycles.

15. The method of claim 13 further comprising the steps of:

summing the usage measurements;

acquiring at least one multiplicative value associated with the usage measurements and with unit costs; and recording any such acquired multiplicative value as an on demand charge to a requesting customer.

16. The method of claim 13 further comprising at least one of the following steps:

posting the on demand charge on a web site if requested by the requesting customer, and sending the demand charge via e-mail to the requesting customer's e-mail address.

17. The method of claim 13 further comprising charging the on demand charge to the requesting customer's account if an account exists and if the requesting customer has selected a charge account payment method.

18. The method of claim 1 including deploying, accessing, and executing process software for autonomic e-mail processing through a virtual private network, the method further comprising the steps of:

determining if a virtual private network is required;

checking for remote access to the virtual private network when it is required;

if the remote access does not exist, identifying a third party provider to provide secure, encrypted connections between a private network and remote users;

identifying the remote users; and setting up a network access server for downloading and installing client software on desktop computers for remotely accessing the virtual private network;

accessing the process software;

transporting the process software to at least one remote user's desktop computer; and executing the process software on the at least one remote user's desktop computer.

19. The method of claim 18 further comprising:

determining if the virtual private network has a site-to-site configuration for providing site-to-site access, and if the virtual private network is not so available, installing equipment required to establish a site-to-site configuration for the virtual private network;

installing large scale encryption into the site-to-site virtual private network; and accessing the process software through the site-to-site configuration with large scale encryption.

20. The method of claim 19 wherein the step of accessing the process software further comprises one of the following steps:

dialing into the network access server, and attaching directly via a modem into the network access server, the modem being selected from the group of modems consisting of telephone dial-up modems, cable modems, DSL modems and wireless modems.

* * * * *